United States Patent
Murakata

(10) Patent No.: US 7,372,592 B2
(45) Date of Patent: May 13, 2008

(54) INFORMATION PROCESSING CONTROL METHOD, IMAGE PROCESSING CONTROL METHOD, IMAGE PROCESSING CONTROL APPARATUS, IMAGE FORMING APPARATUS, AND COMPUTER PRODUCT

(75) Inventor: Akira Murakata, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 670 days.

(21) Appl. No.: 10/767,425

(22) Filed: Jan. 30, 2004

(65) Prior Publication Data

US 2004/0261074 A1   Dec. 23, 2004

(30) Foreign Application Priority Data

Jan. 31, 2003   (JP)   ............................. 2003-024849
Sep. 19, 2003   (JP)   ............................. 2003-328638

(51) Int. Cl.
*G06F 7/00* (2006.01)

(52) U.S. Cl. .................... 358/1.15; 717/178; 717/173; 713/1; 358/1.13

(58) Field of Classification Search ................ 358/1.1, 358/1.13, 1.15; 717/178, 173, 35; 713/1; 709/229
See application file for complete search history.

(56) References Cited

U.S. PATENT DOCUMENTS 6,785,727 B1 *   8/2004   Yamazaki ................... 709/229
6,981,134 B2 *   12/2005   Yamamura ..................... 713/1

FOREIGN PATENT DOCUMENTS

| JP | 6-125411 | 5/1994 |
| JP | 6-205301 | 7/1994 |
| JP | 7-221996 | 8/1995 |

* cited by examiner

*Primary Examiner*—King Y. Poon
*Assistant Examiner*—Jamares Washington
(74) *Attorney, Agent, or Firm*—Oblon, Spivak, McClelland, Maier & Neustadt, P.C.

(57) ABSTRACT

A digital signal processor (DSP) realizes an image processing function by downloading at least one of a computer program and data to realize image processing. A DSP controller that controls the DSP includes a translating unit and a download request unit. The translating unit translates information from an operating unit to information that is recognized by the DSP controller. The download request unit makes a request for download of the program and the data to the DSP based on the information translated.

18 Claims, 31 Drawing Sheets

( INFORMATION FROM OPERATING UNIT IS
CONVERTED AND ASIC SETTING IS PERFORMED )

CONVENTIONAL ASIC CONTROLLLER ( TRANSLATING UNIT THAT TRANSLATES
INFORMATION FROM OPERATING UNIT TO INFORMATION
THAT IS RECOGNIZED BY DSP CONTROLLER )

( DOWNLOAD REQUEST UNIT THAT MAKES
REQUEST FOR DOWNLOAD TO DSP BASED ON
INFORMATION TRANSLATED )

NEW DSP CONTROLLER

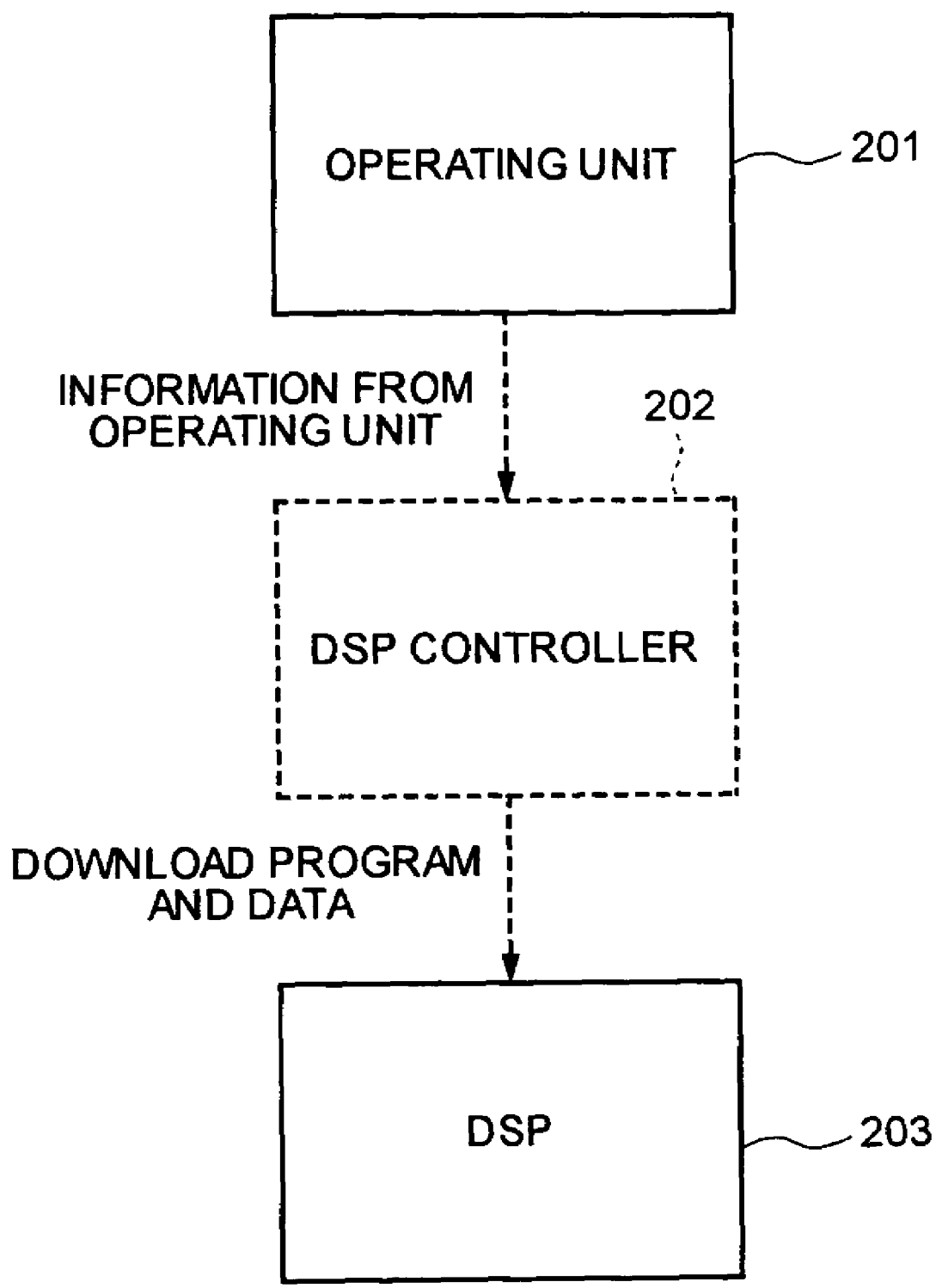

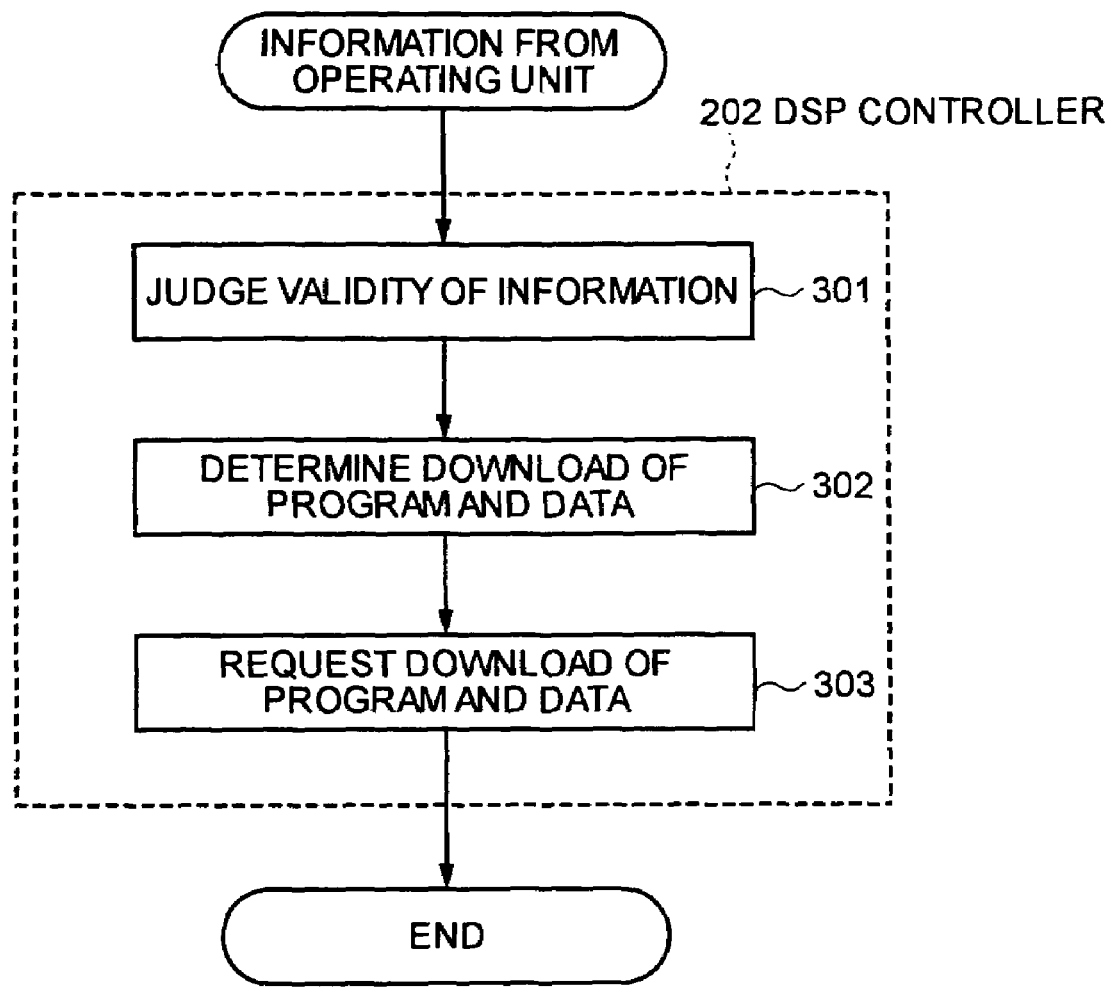

CASE OF PERFORMING CENTRAL MANAGEMENT

CASE OF PERFORMING MANAGEMENT FOR EACH IMAGE PROCESSING

FIG.8

```
const u_char Tbl[REQUEST LEVEL 1]
REQUEST LEVEL 2] [REQUEST LEVEL 3] [2] = {
{
        { {P2,D2}, {P2,D2}, {P2,D2}, {P2,D2}, },
        { {P0,D0}, {P0,D0}, {P0,D0}, {P0,D0}, },
        { {P3,D3}, {P3,D3}, {P3,D3}, {P3,D3}, }
    },
    {
        { {P4,D4}, {P4,D4}, {P4,D4}, {P4,D4}, },
        { {P5,D5}, {P5,D5}, {P5,D5}, {P5,D5}, },
        { {P6,D6}, {P6,D6}, {P6,D6}, {P6,D6}, }
    },
    {
        { {P7,D7}, {P7,D7}, {P7,D7}, {P7,D7}, },
        { {P8,D8}, {P8,D8}, {P8,D8}, {P8,D8}, },
        { {P9,D9}, {P9,D9}, {P9,D9}, {P9,D9}, }
    },
    {
        { {P10,D10}, {P10,D10}, {P10,D10}, {P10,D10}, },
        { {P11,D11}, {P11,D11}, {P11,D11}, {P11,D11}, },
        { {P12,D12}, {P12,D12}, {P12,D12}, {P12,D12}, }
    },
    {
        { {P13,D13}, {P13,D13}, {P13,D13}, {P13,D13}, },
        { {P14,D14}, {P14,D14}, {P14,D14}, {P14,D14}, },
        { {P15,D15}, {P15,D15}, {P15,D15}, {P15,D15}, }
    }
},
```

FIG.9

```
const u_char Prog_Tbl [5][16] = {
/* P0 P1 P2 P3 P4 P5 P6 P7 P8 P9 P10 P11 P12 P13 P14 P15 */
{ 29, 1, 29, 0, 3, 5, 5, 5, 5, 5, 28, 28, 28, 29, 29, 29, },
{  0, 0,  0, 0, 0, 0, 0, 0, 0, 0,  0,  0,  0,  0,  0,  0, },
{  0, 0,  0, 0, 0, 0, 0, 0, 0, 0,  0,  0,  0,  0,  0,  0, },
{  0, 0,  0, 0, 0, 0, 0, 0, 0, 0,  0,  0,  0,  0,  0,  0, },
{  0, 0,  0, 0, 1, 0, 0, 0, 0, 0,  0,  0,  0,  0,  0,  0, },
```

CASE OF PERFORMING CENTRAL MANAGEMENT

CASE OF PERFORMING MANAGEMENT FOR EACH IMAGE PROCESSING

NEW CONCEPT OF APPARATUS FOR CONTROLLING IMAGE PROCESSING

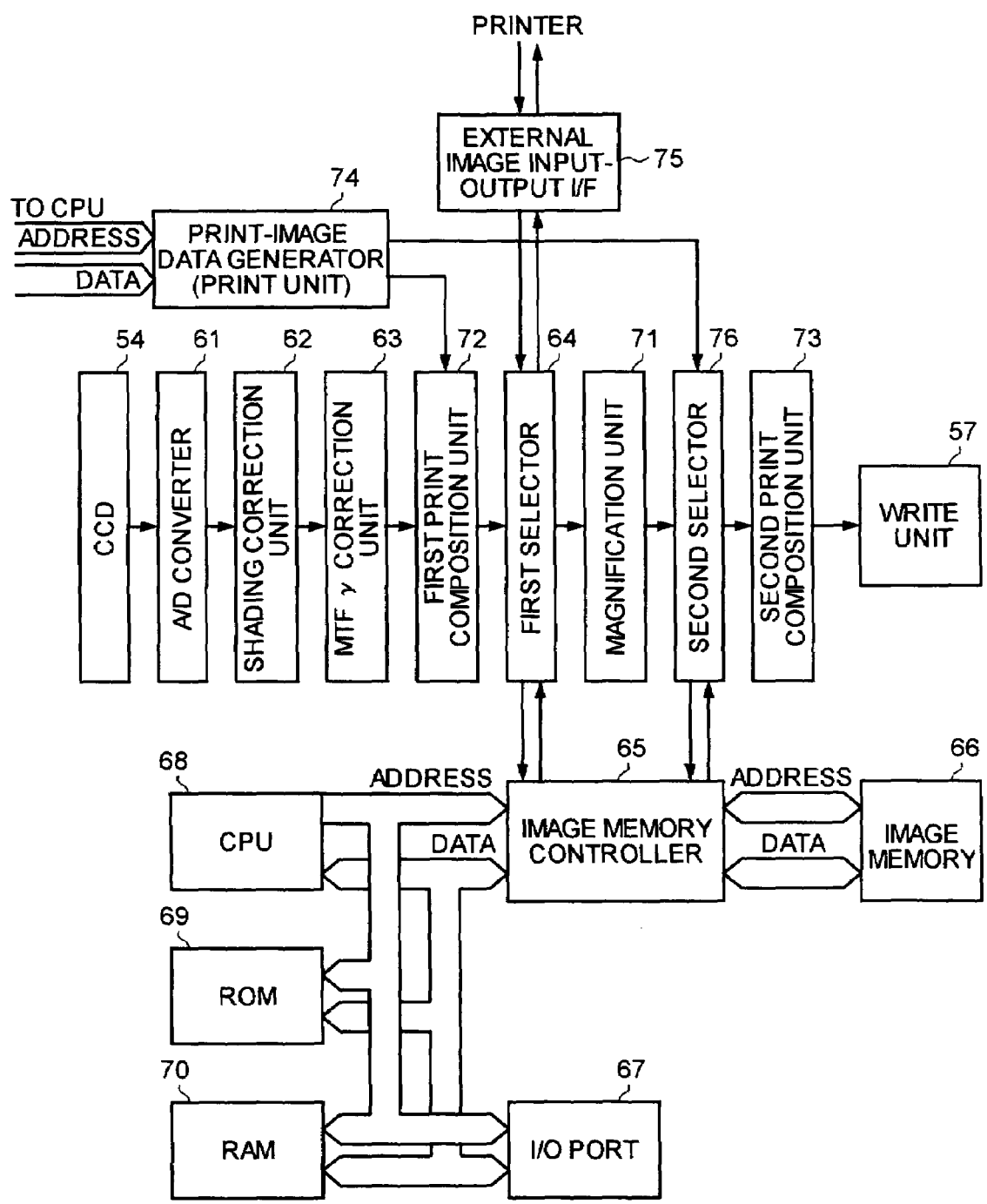

WHEN EXECUTING PHOTOCOPY

WHEN EXECUTING PRINTOUT

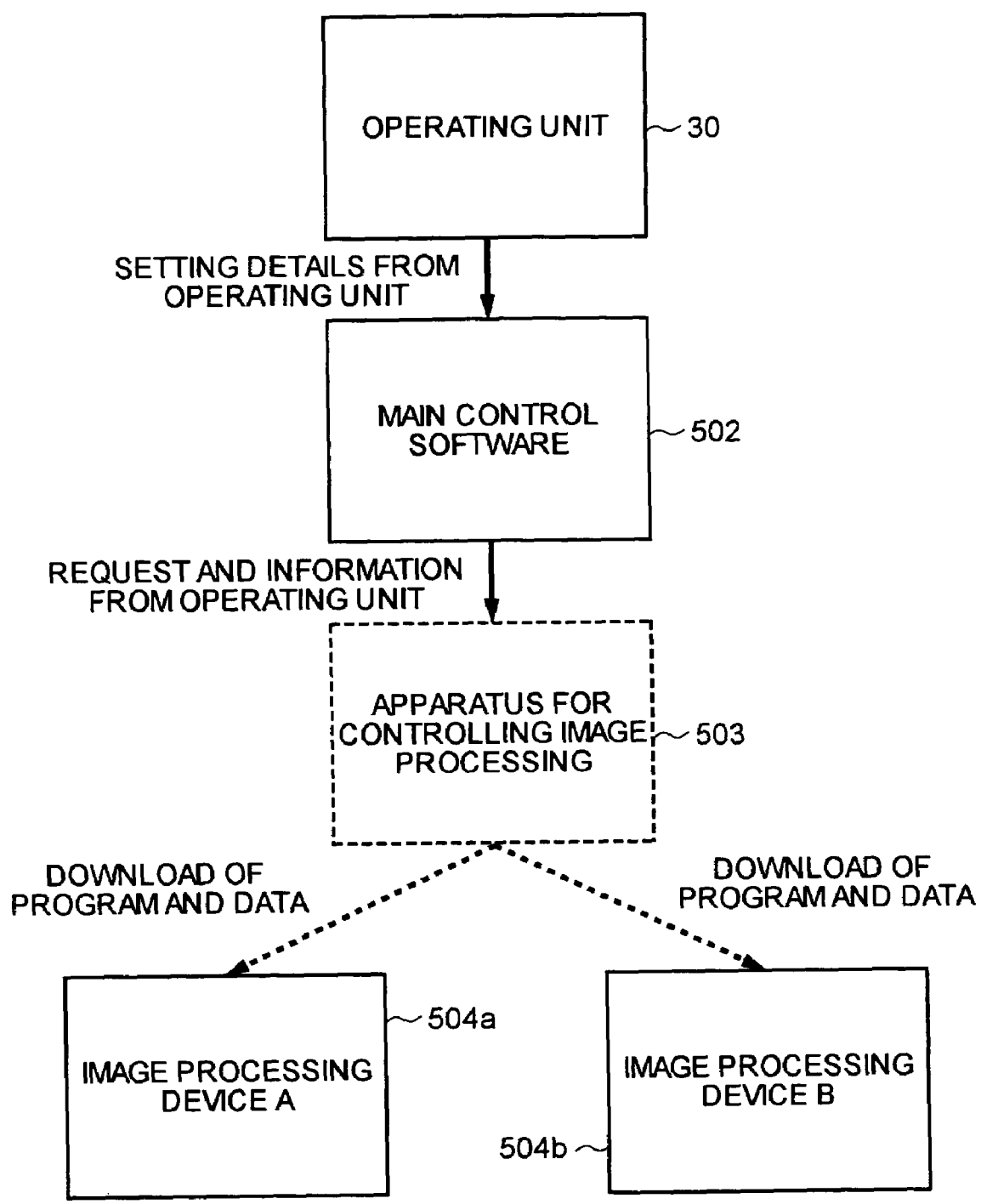

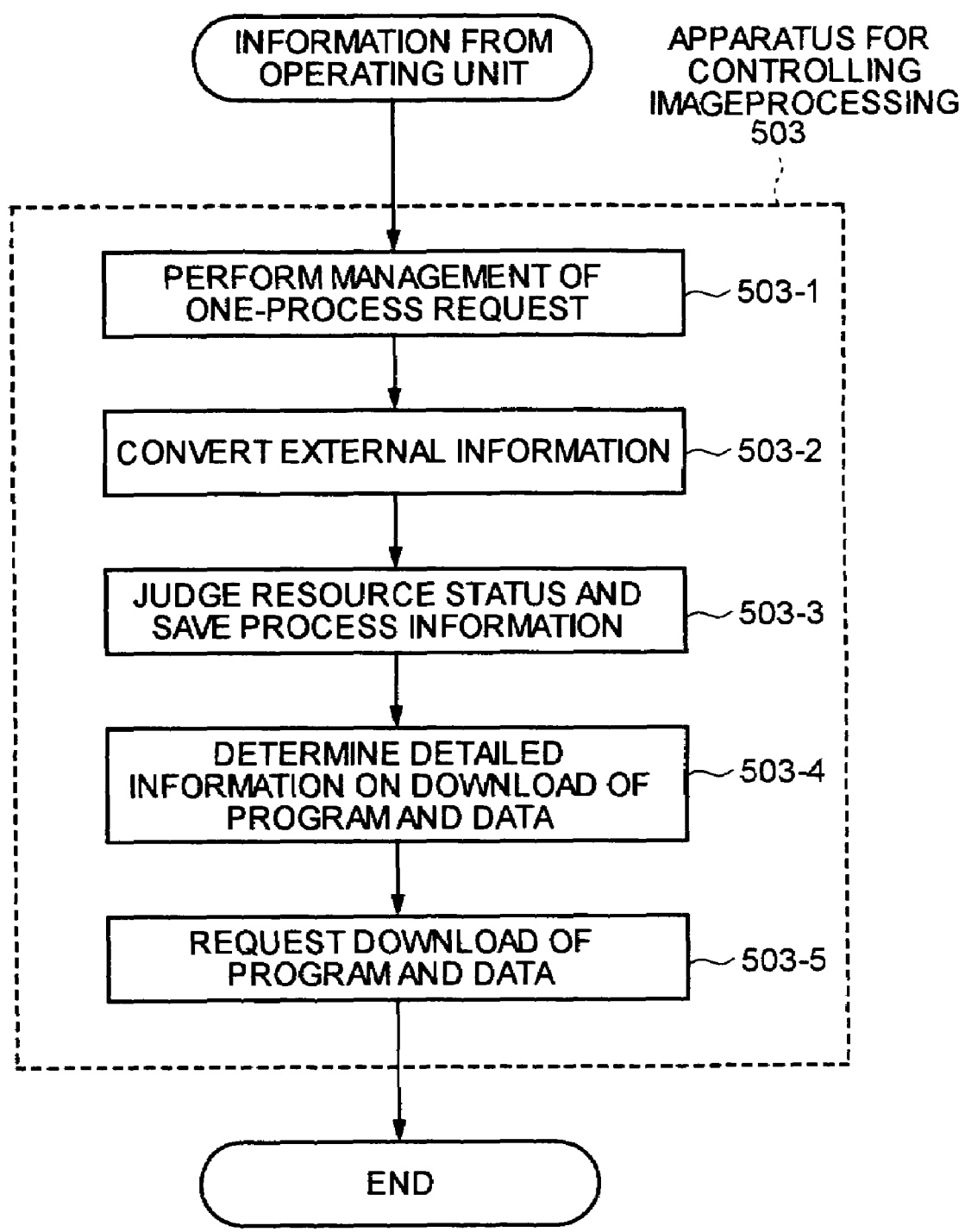

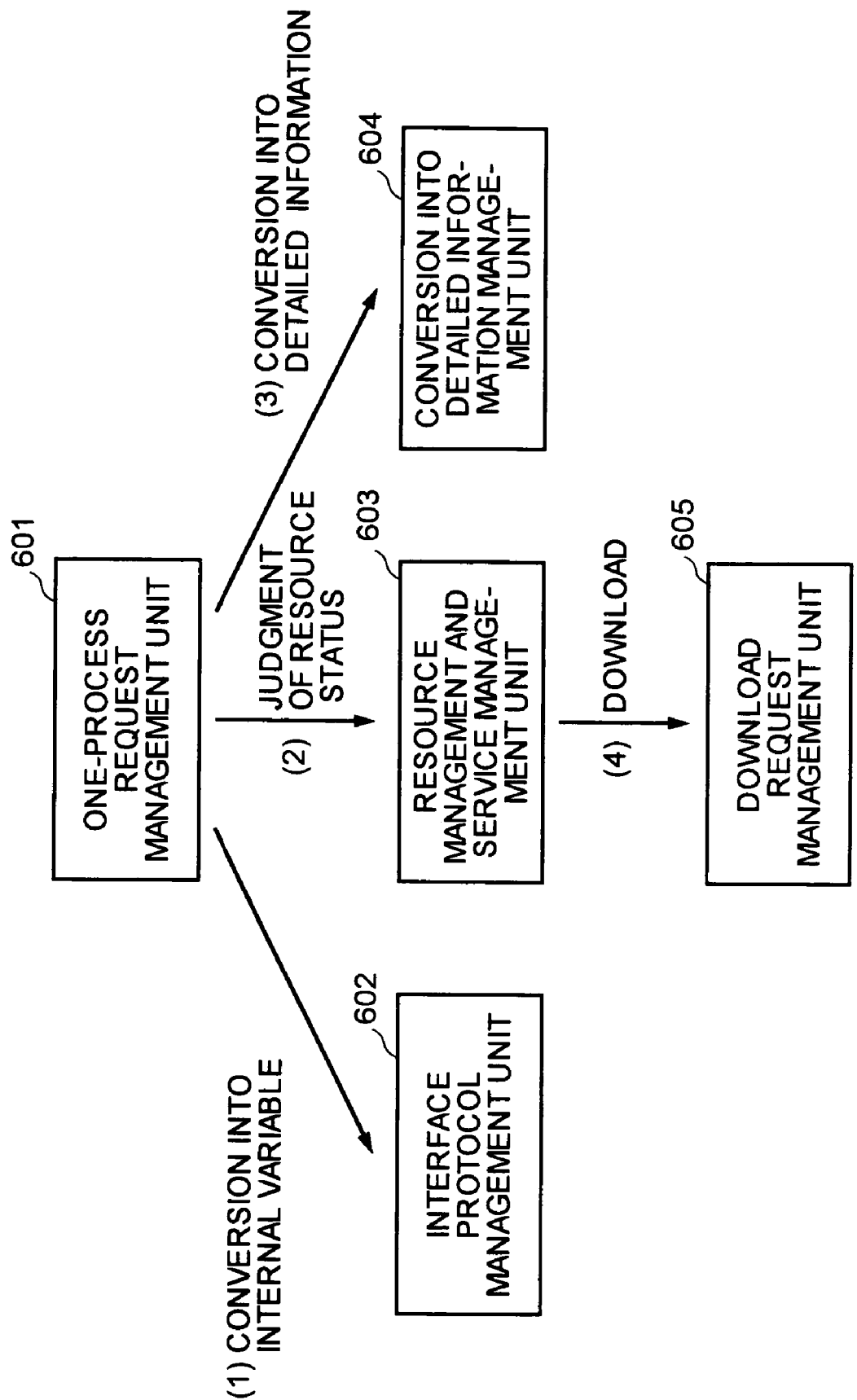

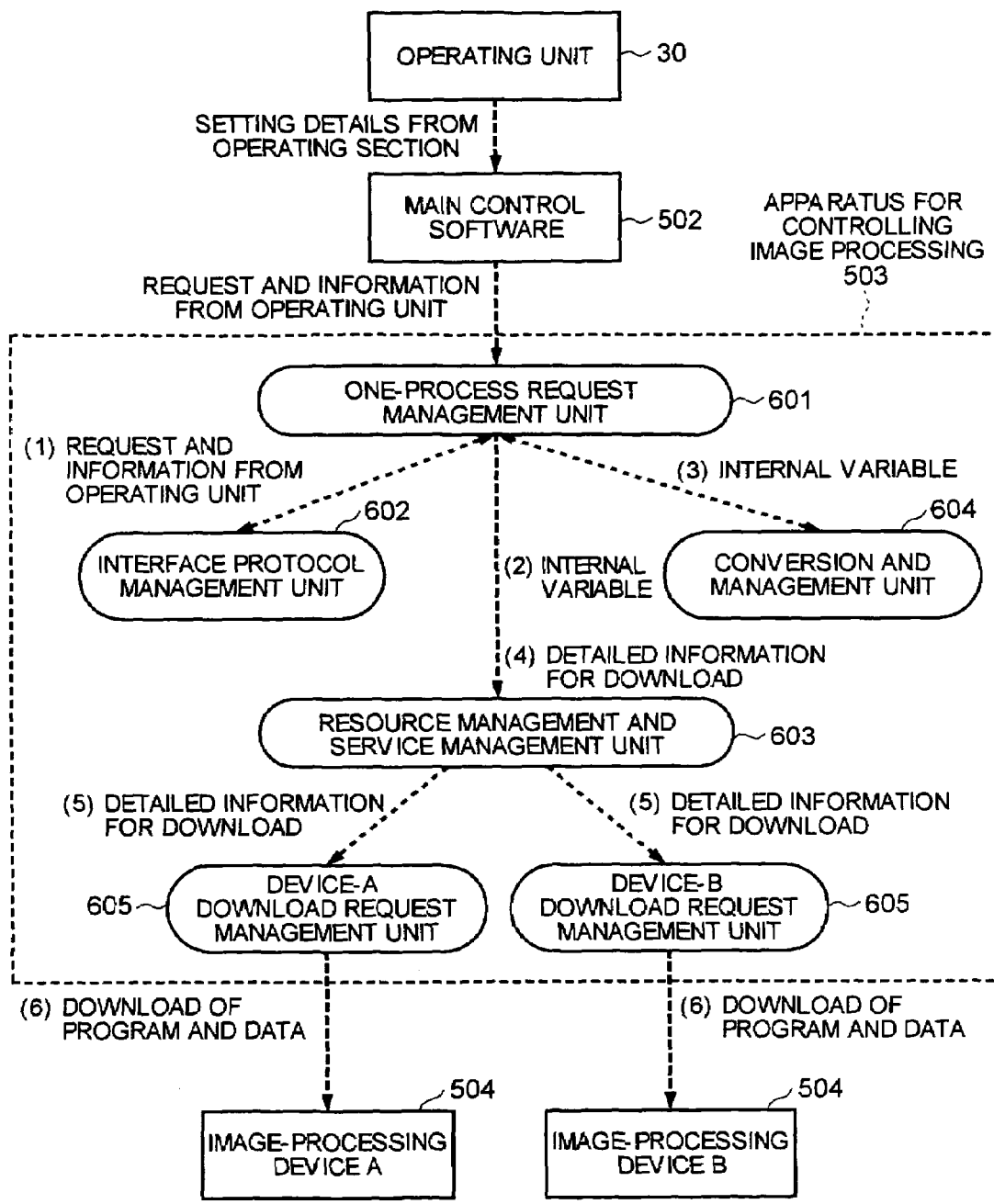

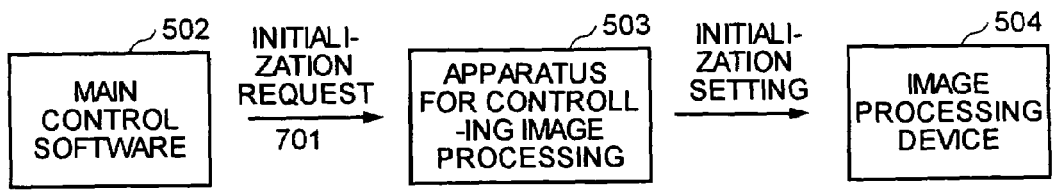
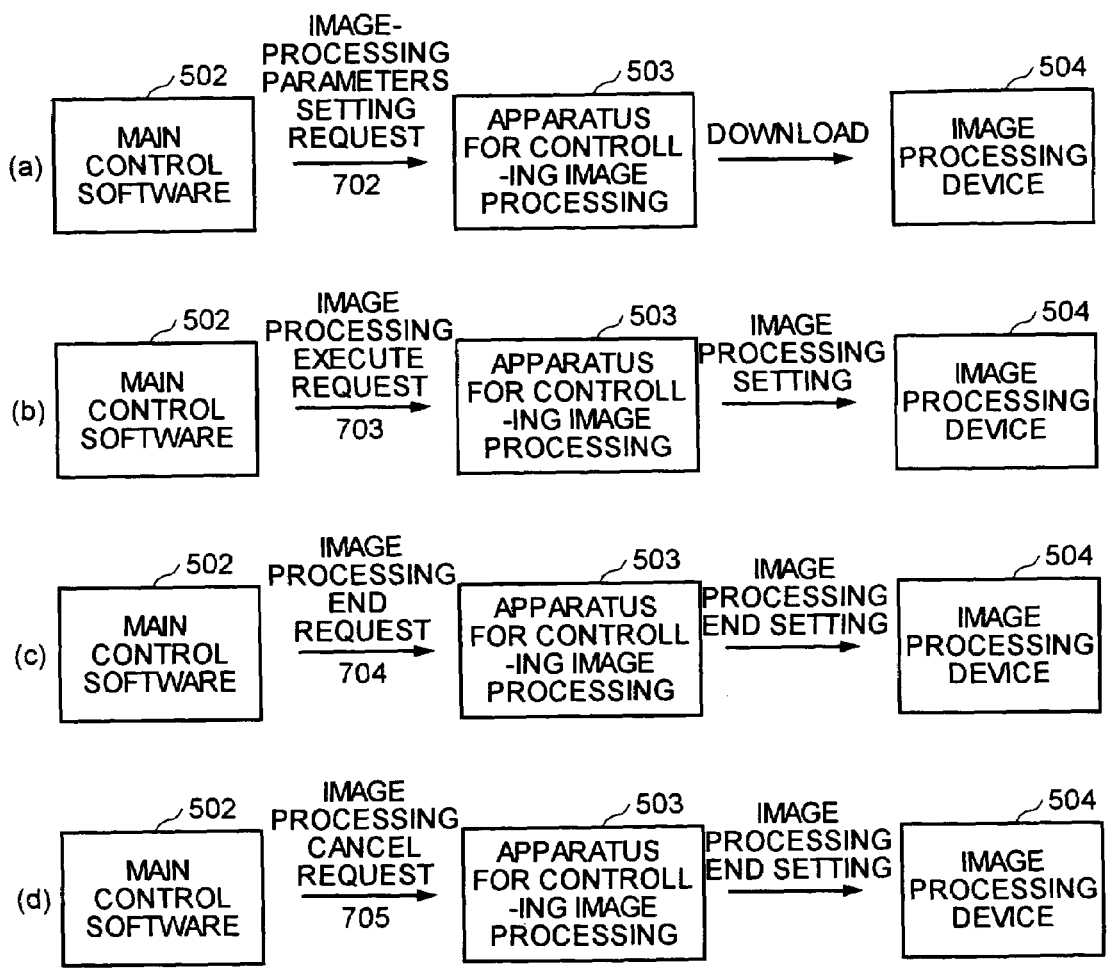

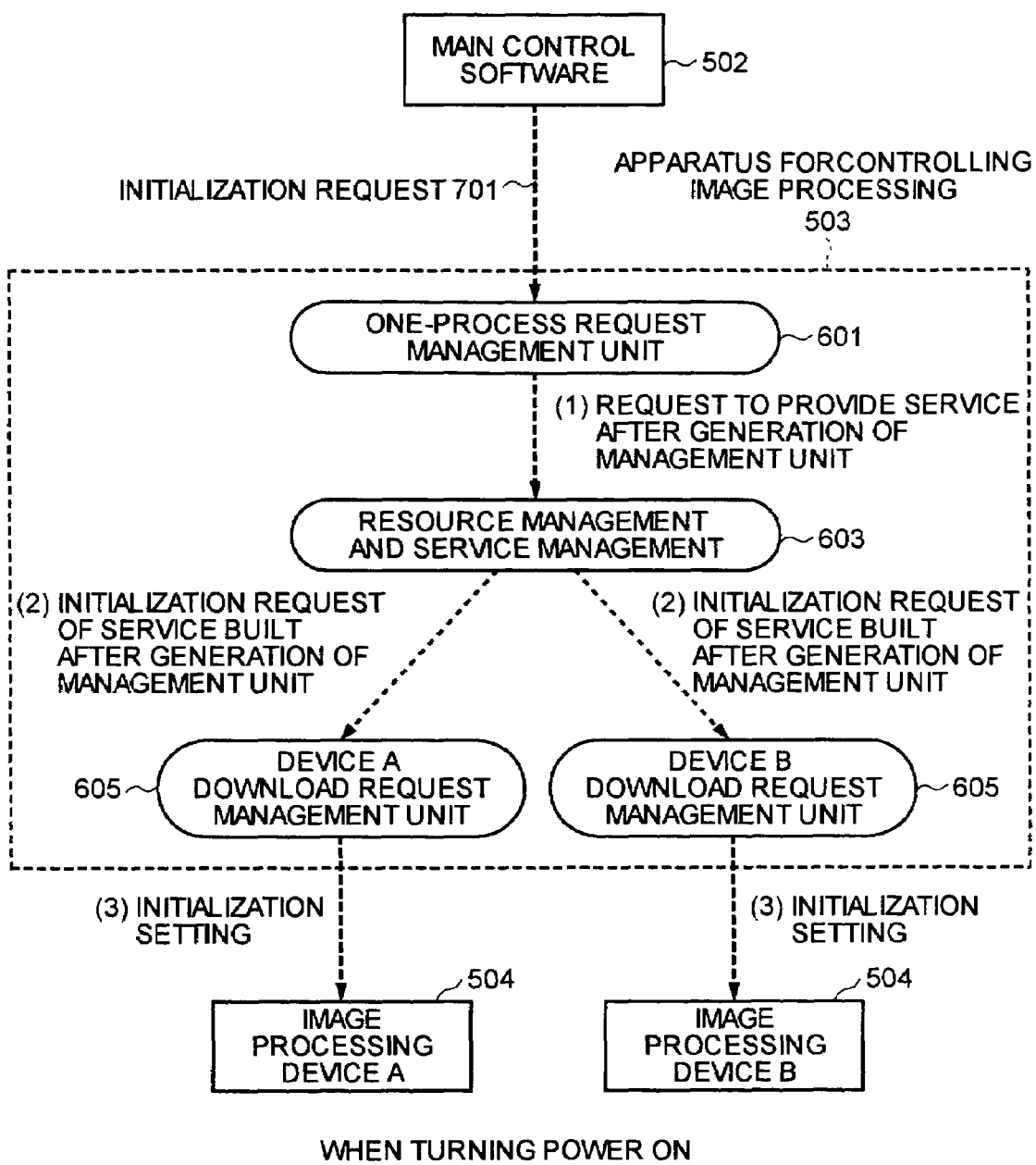

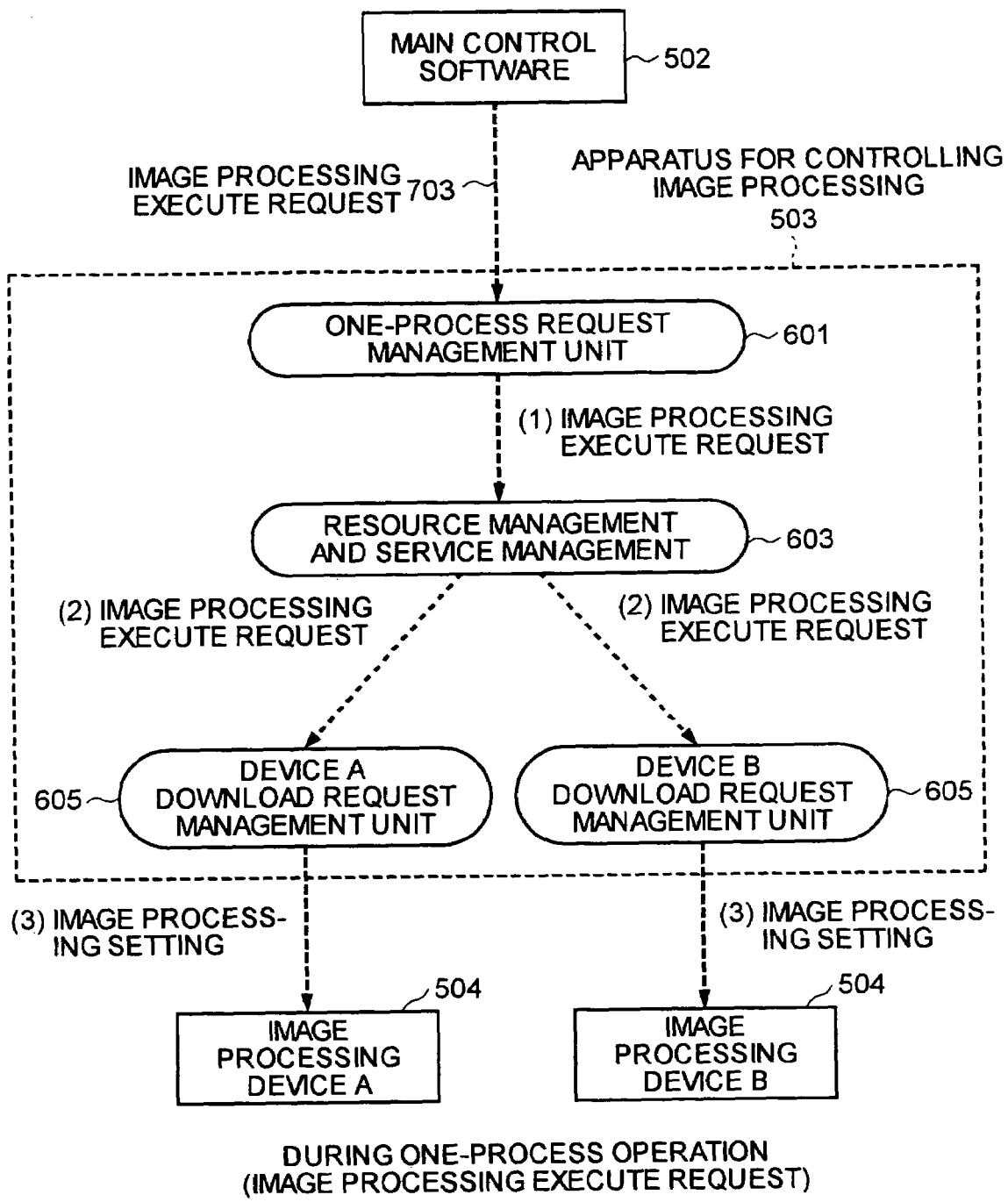

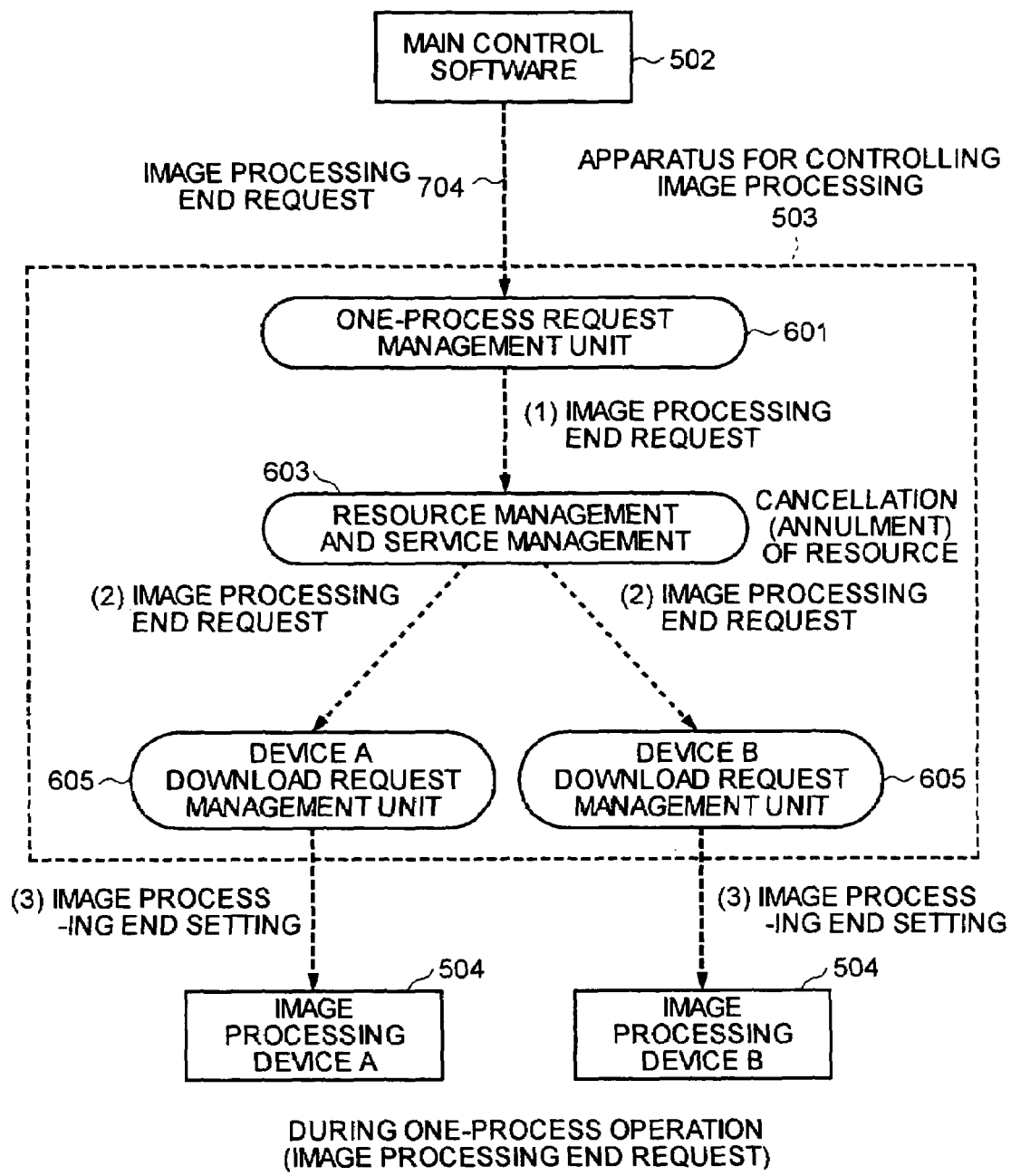

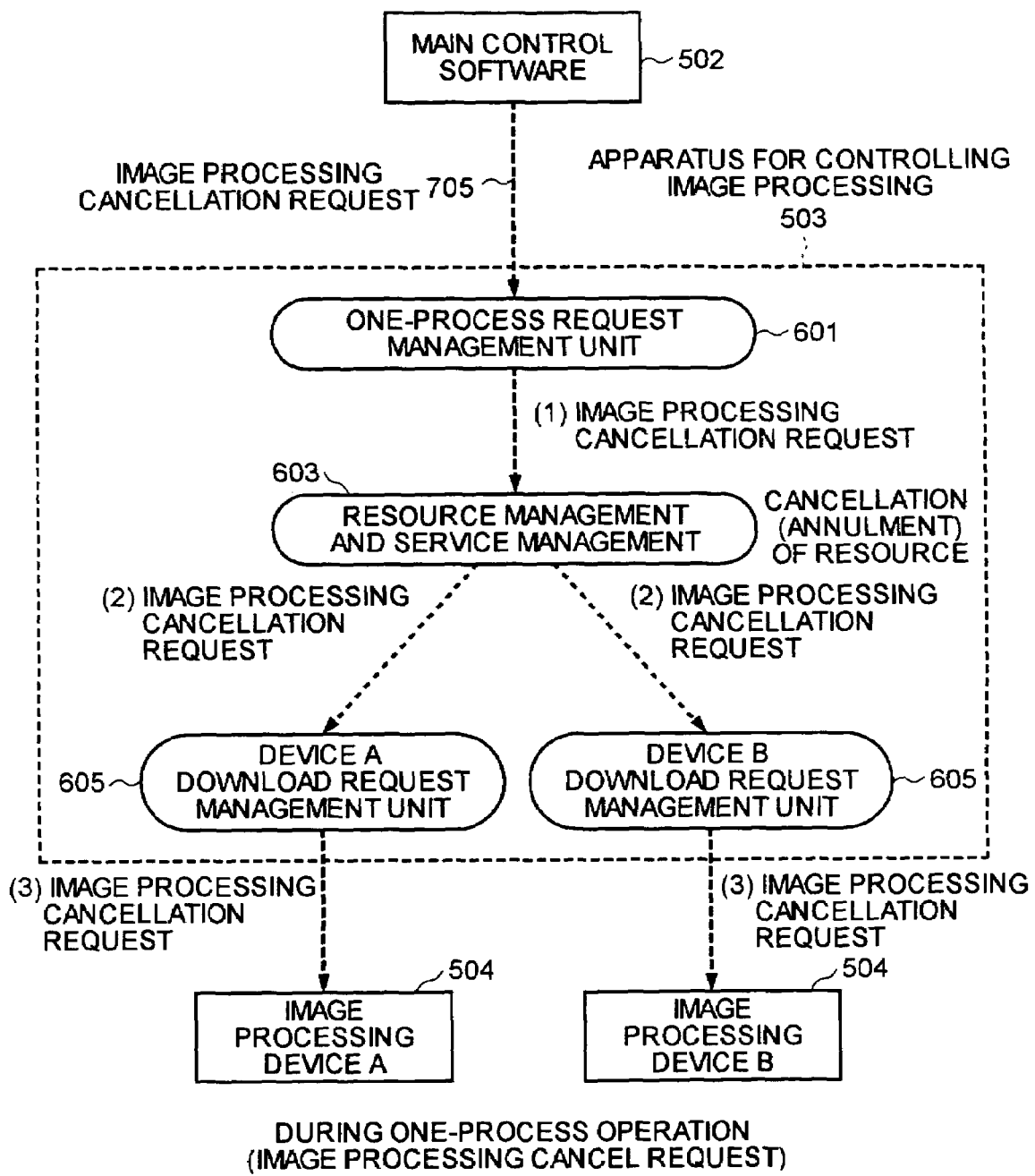

1. PERFORMED BY MAIN CONTROL SOFTWARE

2. PERFORMED BY IMAGE CONTROLLING APPARATUS 203

RESOURCE MANAGEMENT

1. COPY OPERATION

2. SIMULTANEOUS COPY AND PRINTOUT OPERATION

EXAMPLE OF CONTROL OF RESOURCE MANAGEMENT

EXAMPLE OF CONTROL OF SERVICE MANAGEMENT

INFORMATION PROCESSING CONTROL METHOD, IMAGE PROCESSING CONTROL METHOD, IMAGE PROCESSING CONTROL APPARATUS, IMAGE FORMING APPARATUS, AND COMPUTER PRODUCT

CROSS-REFERENCE TO RELATED APPLICATIONS

The present document incorporates by reference the entire contents of Japanese priority documents, 2003-024849 filed in Japan on Jan. 31, 2003 and 2003-328638 filed in Japan on Sep. 19, 2003.

BACKGROUND OF THE INVENTION

1) Field of the Invention

The present invention relates to a technology to implement information processing and image processing by employing component-based software.

2) Description of the Related Art

An improved performance of a copying machine (multi-function Product (MFP)) has led to realization of image processing over wide range and with high speed. With this, products have become multifunctional and it has become possible to set a large number of requests in an operating unit. This has led to a requirement of an apparatus for controlling image processing that controls a large number of requests. On the other hand, an improved performance of a digital signal processor (DSP) has led to realization of image processing over wide range and with high speed. With this, products have become multifunctional and it has become possible to set a large number of requests in the operating unit. This has led a requirement of a DSP controller that controls a large number of requests.

As compared to a conventional application-specific integrated circuit (ASIC), the DSP can realize various types of image processing by replacing a computer program or data. Thus, there is an increased variation of image processing. On the other hand, a controller that controls the DSP has become complicated. Moreover, since specifications can be changed easily, the control of image processing has to be prompt and assured to deal with changes in specifications expected to be made frequently.

However, since the DSP is costlier than ASIC, ASIC is used for image processing in which the changes are not frequent. A device that realizes such image processing is selected according to use or made compatible for both. Therefore, the controller is necessary. Moreover, with increased number of functions, the applications of printers, scanners, facsimile which are connected to copying machine and network have increased. The use by a plurality of users can also be considered by connecting the users to a network and resource management of resources of an apparatus for controlling image processing has been gaining importance. The resource management includes management of a resource condition (status) that is controlled currently by the apparatus for controlling image processing when a certain user is making a large number of copies, another user makes a print via the network and when a judgment of not both the users can execute the jobs simultaneously is made, waiting status of image-processing control is informed upon the latter request and the request is asked to be made again.

Conventional DSP controllers are disclosed in Japanese Patent Application Laid-open Publication Nos. H6-125411, H6-205301, and H7-221996.

However, in the disclosures in these patent documents, a control corresponding to a complicated request like that by a copying machine is not required. Since component-based functioning of the DSP controller as a unit is being considered, considerable changes are required to be made for porting to a similar image processing apparatus. Nowadays, the DSP has been used for image processing by a digital copying machine and the DSP controller is becoming more and more complicated with increase in functions. The DSP controllers are sought to deal with processes like fulfilling various requests that are input from an operating unit of the apparatus for controlling image processing and copying machines and deal with flexibility with changes in specifications. However, inventions disclosed in the patent documents mentioned above and conventional apparatuses have not been able to deal with such requests.

SUMMARY OF THE INVENTION

It is an object of the present invention to solve at least the problems in the conventional technology.

The information processing control method that realizes a function of information processing by downloading a program and data to an information processing unit based on an information from an operating unit, according to one aspect of the present invention includes judging validity of the information from the operating unit, determining whether to download the program and the data based on the validity judged, and making a request, upon determining to download the program and the data, for downloading the program and the data to the information processing unit.

The image processing control method that realizes a function of image processing by downloading a program and data to an image processing unit based on an information from an operating unit, according to another aspect of the present invention includes judging validity of the information from the operating unit, determining whether to download the program and the data based on the validity judged, and making a request, upon determining to download the program and the data, for downloading the program and the data to the image processing unit.

The image processing control method that realizes a function of image processing by downloading a program and data to an image processing unit based on an information from an operating unit, according to still another aspect of the present invention includes translating the information from the operating unit into information that is recognized by the image processing unit, judging validity of information based on the information translated, determining whether to download the program and the data based on the validity judged, and making a request, upon determining to download the program and the data, for downloading the program and the data to the image processing unit.

The image processing control method that realizes a function of image processing by downloading a program and data to an image processing unit based on an information from an operating unit, according to still another aspect of the present invention includes converting the information from the operating unit into an internal variable based on a request for controlling image processing from a main control software, determining, based on a status of previously acquired resource and current process information, a resource that has to be acquired to make a response to a request for the resource, determining whether the process is executable with the resource requested, converting the internal variable, upon determining that the process is executable with the resource requested, into detailed information required for downloading the program and the data, and downloading the detailed information to the image processing unit based on a request for executing download.

The apparatus for controlling image processing according to still another aspect of the present invention includes an image processing unit that realizes a function of image processing by downloading a program and data, a first converting unit that converts information from an operating unit into information for downloading the program and the data to the image processing unit, and a downloading unit that downloads the program and the data to the image processing unit based on the information converted by the first converting unit.

The apparatus for controlling image processing according to still another aspect of the present invention includes an image processing unit that realizes a function of image processing by downloading a program and data, a request managing unit that manages a request for single execution, a first converting unit that converts information from an operating unit into an internal variable, a resource managing unit that manages a resource to respond to the request for the single execution and a service of the image processing unit that has the resource, a second converting unit that converts the internal variable into detailed information for downloading the program and the data to the image processing unit, and a downloading unit that downloads the program and the data to the image processing unit based on the detailed information.

The image forming apparatus according to still another aspect of the present invention includes an image processing control apparatus and an image forming unit that forms an image on a recording medium based on image information that is processed by the image processing control apparatus. The image processing control apparatus includes an image processing unit that performs image processing by downloading a program and data, a converting unit that converts information from an operating unit into information for downloading the program and the data to the image processing unit, and a downloading unit that downloads the program and the data to the image processing unit based on the information converted.

The computer program according to still another aspect of the present invention realizes methods of controlling image processing on a computer according to the present invention on a computer.

The computer program according to still another aspect of the present invention realizes functions of each unit of the apparatus for controlling image processing according to the present invention on a computer.

The computer-readable recording medium according to still another aspect of the present invention stores computer programs according to the present invention.

The other objects, features, and advantages of the present invention are specifically set forth in or will become apparent from the following detailed descriptions of the invention when read in conjunction with the accompanying drawings.

BRIEF DESCRIPTION OF THE DRAWINGS

FIG. 2 is a schematic diagram of a system configuration including a DSP controller according to a first embodiment of the present invention;

FIG. 3 is a schematic diagram for illustrating a relation between input and output of the DSP controller according to the first embodiment;

FIG. 8 is an example of a table of a request level of an operating unit according to the second embodiment;

FIG. 9 is an example of a computer program table that is referred by the download request unit according to the second embodiment when downloading a computer program;

FIG. 19 is a block diagram of details of an image processing unit of the image forming apparatus according to the fourth embodiment;

FIG. 21 is an example of an image processing that includes the apparatus for controlling image processing according to the fourth embodiment;

FIG. 22 is a schematic diagram for illustrating operating procedure of the apparatus for controlling image processing shown in FIG. 21;

FIG. 23 is a schematic diagram for illustrating a process sequence of one process of the apparatus for controlling image processing shown in FIG. 21;

FIG. 24 is a schematic diagram of an apparatus for controlling image processing and overall image processing configuration according to a fifth embodiment of the present invention;

FIG. 25A and FIG. 25B are schematic diagrams for illustrating a relation between an apparatus for controlling the image processing and main control software in image processing according to a sixth embodiment of the present invention;

FIG. 26 is a schematic diagram for illustrating a process flow of the apparatus for controlling image processing of an initialization request from the main control software;

FIG. 27 is a schematic diagram for illustrating a process flow of the apparatus for controlling image processing of image processing execute request from the main control software;

FIG. 28 is a schematic diagram for illustrating a process flow of the apparatus for controlling image processing of image-processing end request from the main control software;

FIG. 29 is a schematic diagram for illustrating a process flow of the apparatus for controlling image processing of image-processing cancel request from the main control software;

DETAILED DESCRIPTION

Figures 1A, 1B:
FIG. 1 is a conceptual diagram of a conventional ASIC controller and a DSP controller according to the present invention.

Exemplary embodiments of an information processing control method, an image processing control method, an image processing control apparatus, and image forming apparatus, and a computer product according to the present invention are explained in detail with reference to the accompanying drawings.

According to the present invention, an apparatus for controlling image processing that is an assembly like a digital copying machine can be used as a component and can be used in different image forming apparatuses, thereby facilitating porting of an image processing function and enabling to deal with flexibility with changes in specifications.

It is possible to unify an architecture unit of image processing functions like copying, scanner applications etc. by including functions necessary as the apparatus for controlling image processing in components, thereby facilitating porting of the image processing functions and enabling to deal with flexibility, with changes in specifications.

Exemplary embodiments of the present invention are described in detailed below with reference to accompanying diagrams. In the embodiments, same reference numerals are used for identical components and detailed description of these components is omitted to avoid repetition.

FIG. 1 is a conceptual diagram of a conventional ASIC controller and a DSP controller according to the present invention. In the conventional structure (a), an ASIC that is controlled has a low degree of freedom. Therefore, a translating unit that translates information that is input from an operating unit to information that is recognized by a controller and a download request unit that makes a download request based on information translated are integrated in the conventional structure. However, when there is a change in specifications, a change has to be made through out, which is a troublesome job. Whereas, in a new structure (b), the translating unit that translates information input from the operating unit to information that is recognized by a DSP controller and a download request unit that makes a request for downloading to the DSP based on information translated are separated from each other. Therefore, it is possible to deal with the changes in specifications by making the minimum changes. Further, the download request unit that makes request for downloading to the DSP based on the information translated is divided into a converting unit that converts to detailed information for downloading to the DSP based on the information translated and a download request unit that makes a request for downloading to the DSP based on information converted. Therefore, it is possible to deal with the changes in specifications by making the minimum changes. Thus, in the present invention, various functions of the DSP are divided and a process desired by a user is performed efficiently by combining various functions according to the requirement.

FIG. 2 is a schematic diagram of a system configuration including a DSP controller according to a first embodiment of the present invention. A system that includes the DSP controller includes an operating unit 201, a DSP controller 202, and a DSP 203. The operating unit 201 inputs a request by a user of the system. The DSP controller 202 transmits download information to the DSP 203 based on information that is input from the operating unit 201. The DSP 203 performs image processing based on information downloaded by the DSP controller 202.

The operating unit can do settings corresponding to various requests from users and transmits the requests to the DSP controller 202. In the DSP controller 202, information of different request level that is output from the operating unit 201 is converted to a computer program and data that are to be set in the DSP 203. The information from the operating unit 201 includes various requests like a mode level of character mode, a function level that specifies a computer program number of MTF filter, and serviceman command etc. The DSP controller 202, based on this information, converts the information to information of detailed level that is required to be downloaded to the DSP 203. The DSP controller 202 downloads to a memory in the DSP 203 based on the computer program and the data that is converted by the DSP controller 202. After downloading, the DSP 203 realizes image processing based on information of the computer program and the data downloaded.

FIG. 3 is a schematic diagram for illustrating a relation between input and output of the DSP controller 202 according to the first embodiment. The DSP controller 202 receives a request made by the system user from the operating unit 201 as input. The request is information like character mode, size, darkness of document, magnification, a number of MTF filter etc. The DSP controller 202 makes a judgment 301 of validity of the information received. The judgment of validity means judging whether the information is valid information or invalid information. If the DSP controller 202 judges the information to be valid, the DSP controller 202 determines download 302 of the computer program and the data based on the valid information and determines a computer program number and a data number to be downloaded to the DSP 203 with that setting. Further, the DSP controller 202 outputs a download request 303 of the computer program and the data to the DSP 203, and ends the process. The DSP controller 202 is awaiting information from the operating unit 201 after the end of the process.

Thus, according to the first embodiment, a suitable DSP control is possible for a request from the operating unit in which various settings can be done in one DSP controller.

Figure 4:
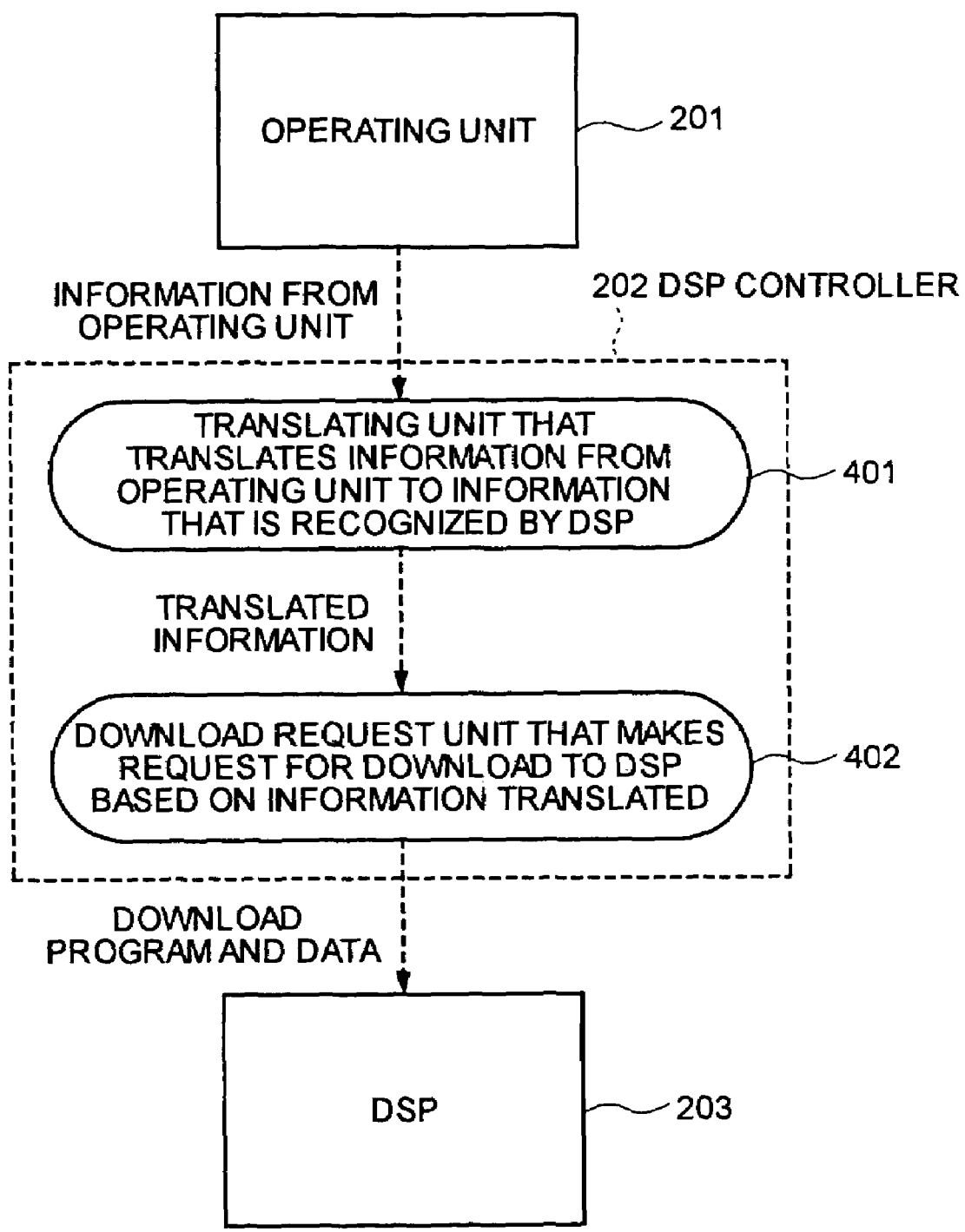
FIG. 4 is a schematic diagram for illustrating a relation between input and output of a DSP controller according to a second embodiment of the present invention.

FIG. 4 is a schematic diagram for illustrating a relation between input and output of a DSP controller according to a second embodiment of the present invention. A system that includes a DSP controller 202 includes the operating unit 201, the DSP controller 202, and the DSP 203. The operating unit 201 inputs a request by the user of the system. The DSP controller 202 transmits the download information to the DSP 203 based on the information that is input from the operating unit 201. The DSP 203 performs image processing based on information downloaded by the DSP controller 202.

The difference between the DSP controller 202 in the first embodiment and that in the second embodiment is that, function of the DSP controller 202 in the second embodiment are divided internally into two main units viz. a translating unit 401 and a download request unit 402. The translating unit translates the information input from the operating unit 201 to information that is recognized by the DSP controller. The download request unit 402 makes a request to DSP for download based on the information translated by the translating unit 401. Since the DSP controller 202 is built-in in the system, the information from the operating unit 201 is transmitted by other control software. When DSP control is required, an execution command is transmitted together to the DSP controller 202. The DSP controller 202 performs DSP control based on the information from the operating unit 201 and the execution command. In other words, the DSP controller 202 is a component of the system. When the DSP controller 202 is to be built-in in other similar system, the porting is facilitated if few changes are to be made. When in other system, the information from the operating unit 201 is changed, if the translating unit 401 is converted (changed) according to changes in the information, the porting can be performed without changing the download request unit 402 that makes a request for download to the DSP 203 based on the information translated.

In this case, the translating unit 401 prepares in advance a table in which the information input and the information that is recognized by the DSP controller 202 corresponding to the information input are associated in a computer program or a memory like RAM etc. When the information is input from the operating unit 201, by referring to the information input, the translating unit translates by converting the information to information that is recognized by the DSP controller 202 corresponding to the input information. The translating process by the translating unit is not restricted to such type of process only. Any translating process in which the information is translated from the information input to the information that is recognized by the DSP controller 202 can be adopted.

Figure 5:
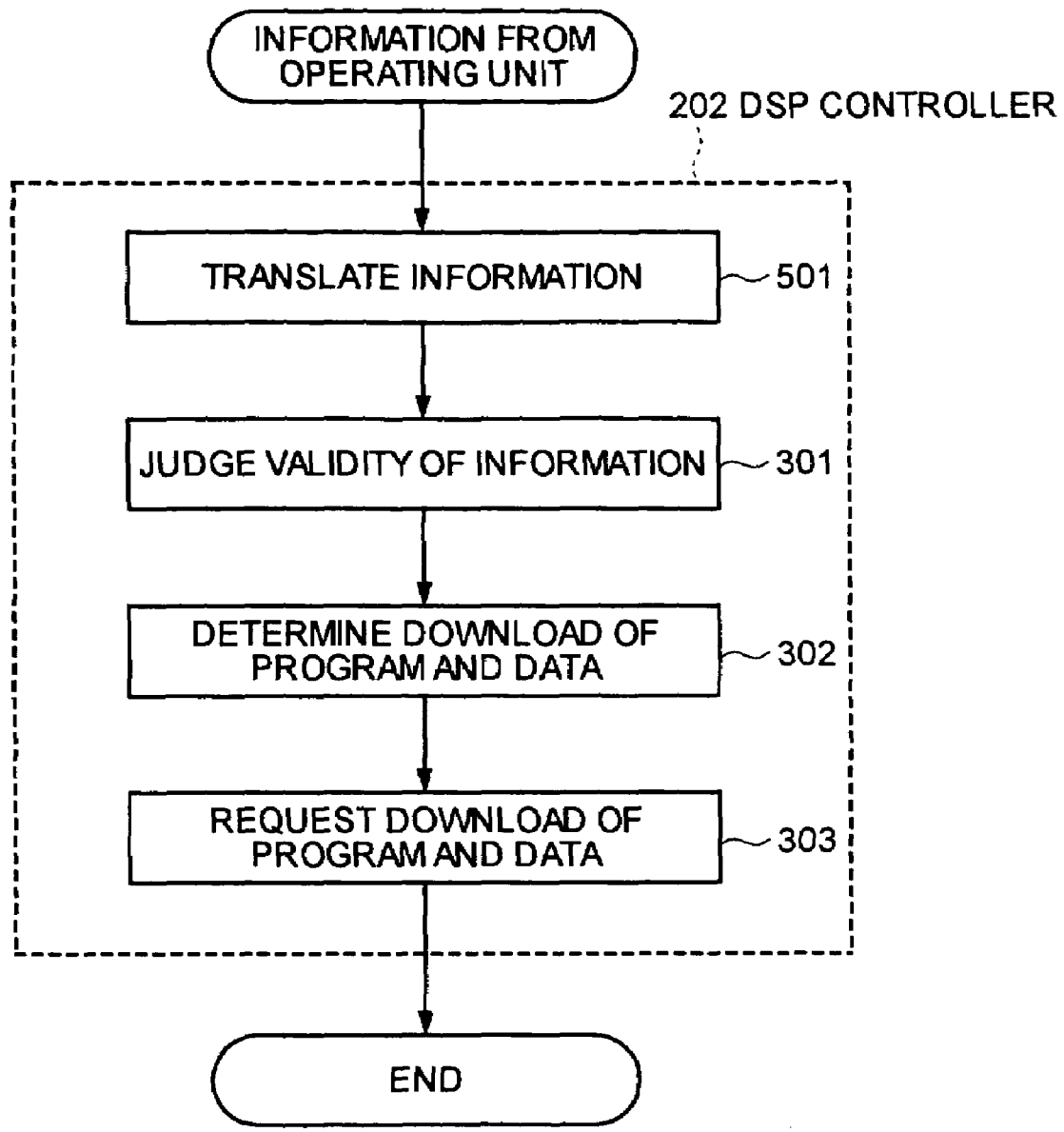
FIG. 5 is a schematic diagram for illustrating the relation between input and output of the DSP controller and a process inside the DSP controller according to the second embodiment.

FIG. 5 is a schematic diagram for illustrating the relation between input and output of the DSP controller 202 and a process inside the DSP controller 202 according to the second embodiment. The DSP controller 202 receives a request made by the system user as input from the operating unit 201. The request is information like character mode, size, darkness of document, magnification, a number of MTF filter etc. The DSP controller translates the information received (501) to the information that is recognized by the DSP controller 202. The DSP controller makes a judgment of validity (301), i.e. judges whether the information is valid information or invalid information. If the DSP controller 202 judges the information to be valid, the DSP controller 202 determines download 302 of the computer program and the data based on the valid information and determines a computer program number and a data number to be downloaded to the DSP 203 with that setting. Further, the DSP controller 202 makes a request for download (303) of the computer program and the data to the DSP 203 and ends the process. The DSP controller 202 is awaiting information from the operating unit 201 after the end of the process.

Figure 6:
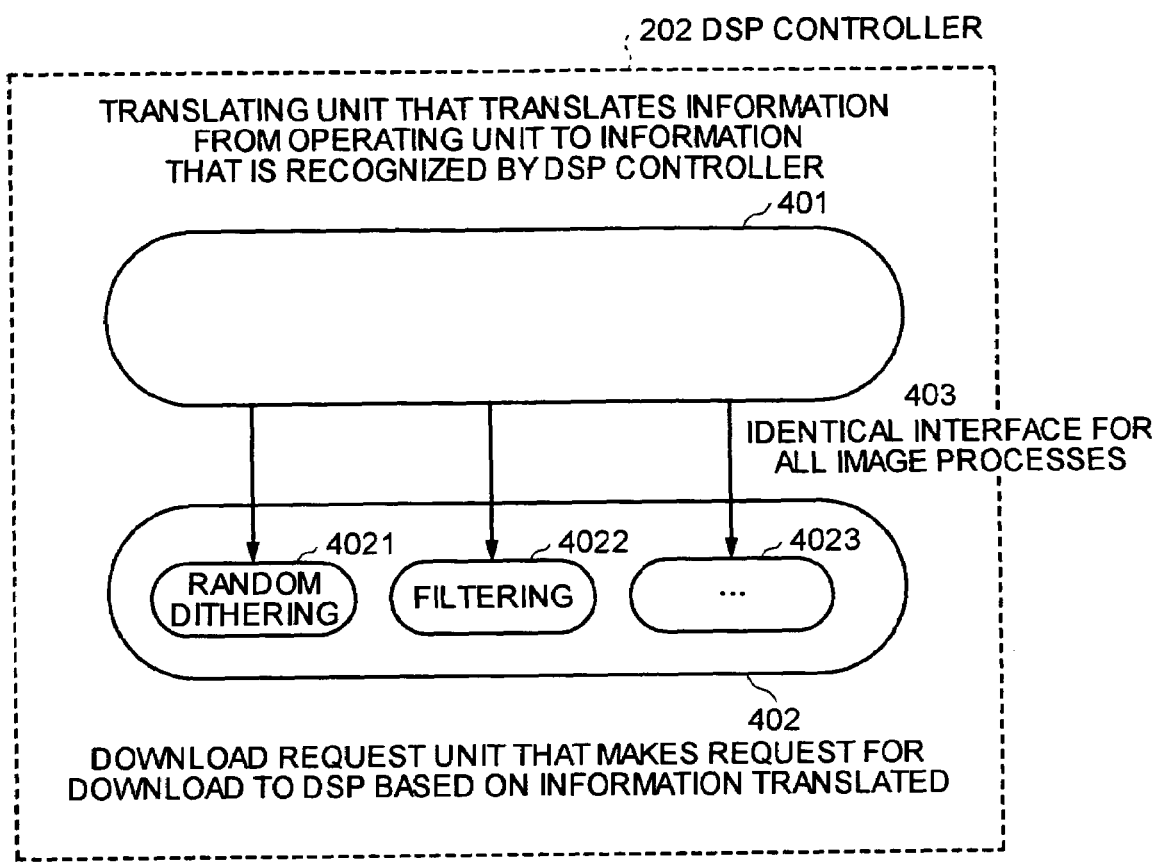
FIG. 6 is a schematic diagram for illustrating a relation between input and output a download request unit and a translating unit of the DSP controller according to the second embodiment.

FIG. 6 is a schematic diagram for illustrating a relation between input and output a download request unit 402 and a translating unit 401 of the DSP controller 202 according to the second embodiment. The DSP 203 can realize image processing like filtering and random dithering by downloading the computer program or the data. The download request unit 402 of the DSP controller 202 that makes the download request to the DSP 203, performs control according to image processing like a random dithering 4021, a filtering 4022, and other processing 4023. By performing the control according to the image processing, when there is a change, it is easy to deal with the change.

There is a plurality of download request units 402 to DSP as in FIG. 6 for each image processing. After the translating unit 401 translates the information, the information necessary for the download is transmitted to the download request unit for each image processing by using a common interface for the overall image processing. Concretely, the information transmitted includes information about each image processing and information of the computer program and the data for which there is a request for download. In each image processing of the download request unit 402 that makes the download request to the DSP 203, the download request is transmitted to the DSP 203 based on the information about each image processing and the information of the computer program and the data for which there is a request for download.

Thus, by using the common interface, when a device that performs the image processing is changed from the DSP 203 to an ASIC, if a controller that controls the ASIC has a structure that enables control by the common interface for each image processing, it is possible to perform control without changing the translating unit 401 and only by changing (replacing) the download request unit 402 to (by) a control setting unit of control to ASIC. Thus, the DSP controller 202 can be changed as a component that facilitates porting and can be mounted easily.

Figure 7A:
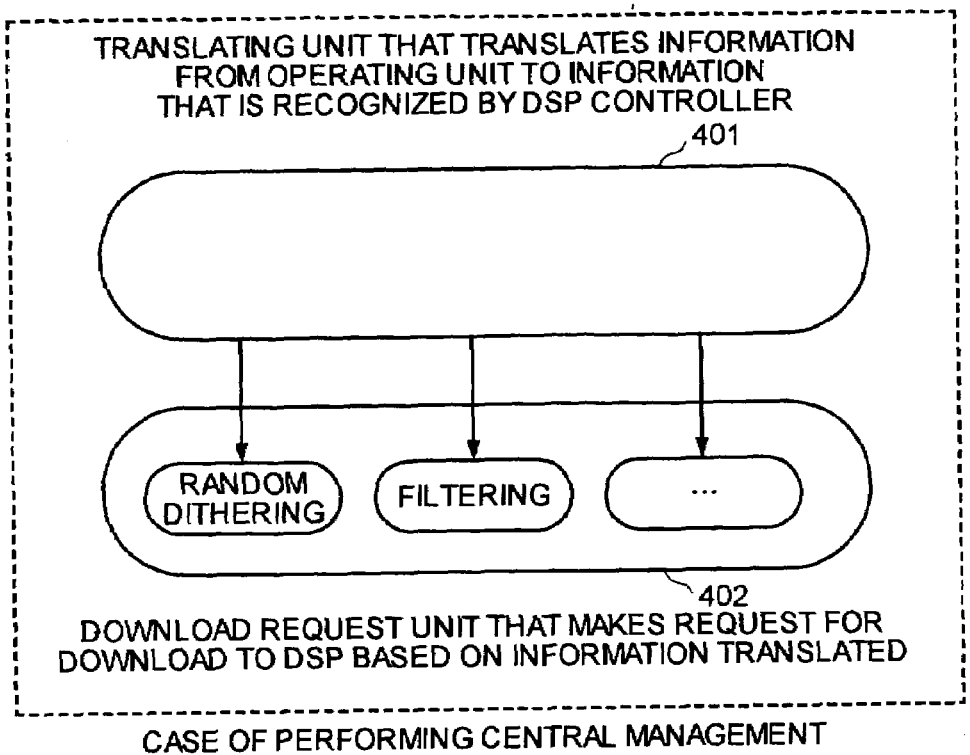
FIG. 7A and FIG. 7B are schematic diagrams for illustrating a management status of the translating unit of the DSP controller according to the second embodiment.
Figure 7B:
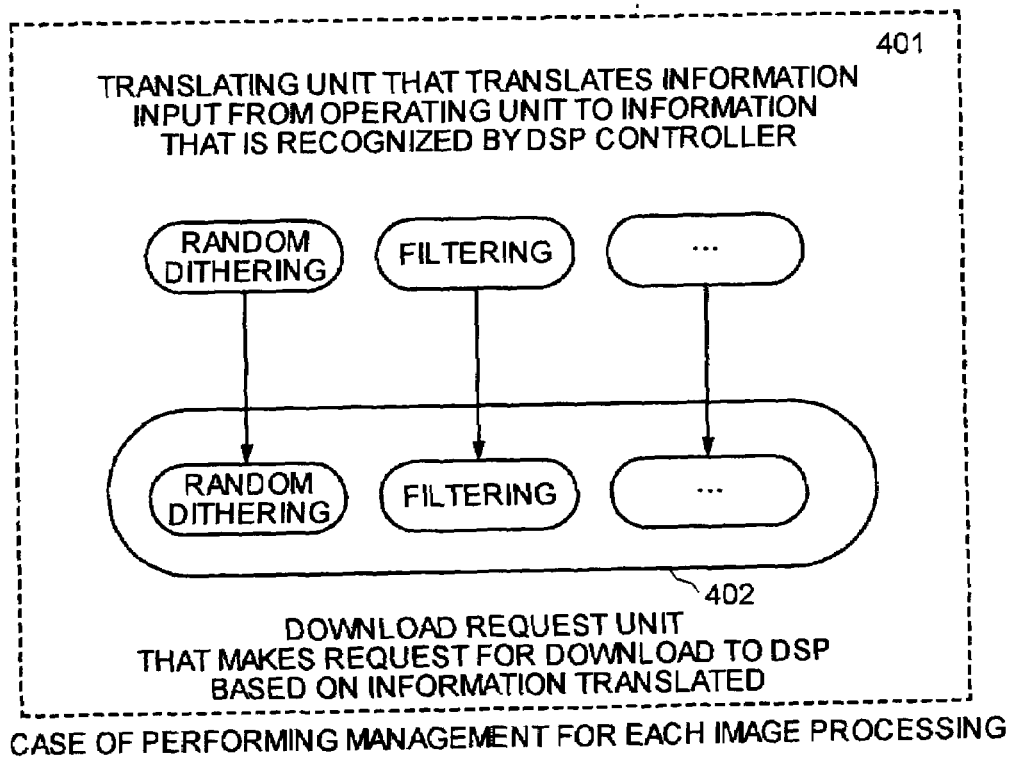

FIG. 7A and FIG. 7B are schematic diagrams for illustrating a management status of the translating unit of the DSP controller 202 according to the second embodiment. FIG. 7A illustrates central management of the translating unit 401 and FIG. 7B illustrates management according to image processing.

In a case of the central management, the information from the operating unit 201 is translated at one location. The translating unit 401 translates the information to a language that is recognized by the DSP controller 202 and transmits the information translated to the download request unit 402 in each image processing. In this structure, when the information from the operating unit 201 is debugged by correcting to a correct setting value, the information is concentrated at one location. Therefore, it is possible to check all the information by tracing a value of the operating unit 201 for that location. When the information from the operating unit 201 changes and it is necessary to change the translating unit 401 that translates the information to the information recognized by the DSP controller at the time of porting, it is possible to build-in just by making a change in a location where the central management is performed.

In a case shown in FIG. 7B where the central management is not performed, if the information from the operating unit 201 is to be debugged or if the information from the operating unit 201 changes and if the translating unit 401 has to be changed at the time of porting, a correction has to be made in the translating unit that translates the information from the operating unit to the information that is recognized by the DSP controllers 202.

Therefore, as shown in FIG. 7A, by performing the central management, when the information from the operating unit 201 changes and when the translating unit 401 is to be changed at the time of porting, it can be build up by making a change in the location that is subjected to central management. This is advantageous over the case where the central management is not performed.

FIG. 8 is an example of a table of a request level of an operating unit 201 according to the second embodiment. The DSP 203, basically, can rewrite freely the computer program and the data and is supposed to realize image processing of different variations. Therefore, information of the computer program and the data that are to be downloaded according to a request level of the operating unit 201 may keep on changing all the time. If management of code that may change any time is performed by source code management, the frequency of the job increases.

The translating unit 401 that translates the information input from the operating unit to the information that recognized by the DSP controller 202 determines information to be downloaded to the download request unit that makes the request of download to the DSP 203 based on the information translated by performing management by a table in which the request level of the operating unit indicates dimension. Request levels 1, 2, and 3 indicate dimensions of the table and determine PX (a type of the computer program) and DX (a type of the data). When factors that are controlled are not changed by the request levels 1, 2, and 3 and when a computer program and data that has to be downloaded by (according to) the request level of the operating unit, a person who is doing the job rewrites a computer program number and a data number without taking into consideration the source code. By rewriting the computer program number and the data number, the source code refers to the numbers and determines the computer program and the data that is to be downloaded. Therefore, the request that is to be transmitted to the download request unit 402 changes. As a result, the computer program and the data which are to be downloaded to the DSP 203 change.

FIG. 9 is an example of a computer program table that is referred by the download request unit 402 according to the second embodiment when downloading a computer program. The DSP 203 basically can rewrite freely the computer program and the data and is supposed to realize image processing of different variations. Therefore, the information of the computer program and the data that is to be downloaded according to the request level of the operating unit 201 may keep on changing all the time. If the management of the code that may change any time is performed by the source code management, the frequency of the job increases.

The download request unit 402, based on the computer program number and the data number determined by the translating unit 401, determines a plurality of computer programs like that indicated in the table. The download request unit 402 makes a request for download of the computer programs determined to the DSP 203. For example, if a computer program number P8 in the table shown in FIG. 8 is selected, the download request unit 402 that makes a request for download to the DSP 203 transmits download request to the DSP for download of five computer programs at numbers 5, 0, 0, 0, and 0 from the table in FIG. 9 and downloads the computer programs.

When types of computer programs and data are to be changed without changing the information from the translating unit 401, the person who is doing the job rewrites an order of the computer programs and data values based on the table without taking into consideration the source code. By rewriting order of the computer programs and that data values, the source code refers to the table and determines the computer program and the data that is to be downloaded. Therefore, the computer program and the data which are to be downloaded to the DSP 203 from the download request unit change.

Figure 10:
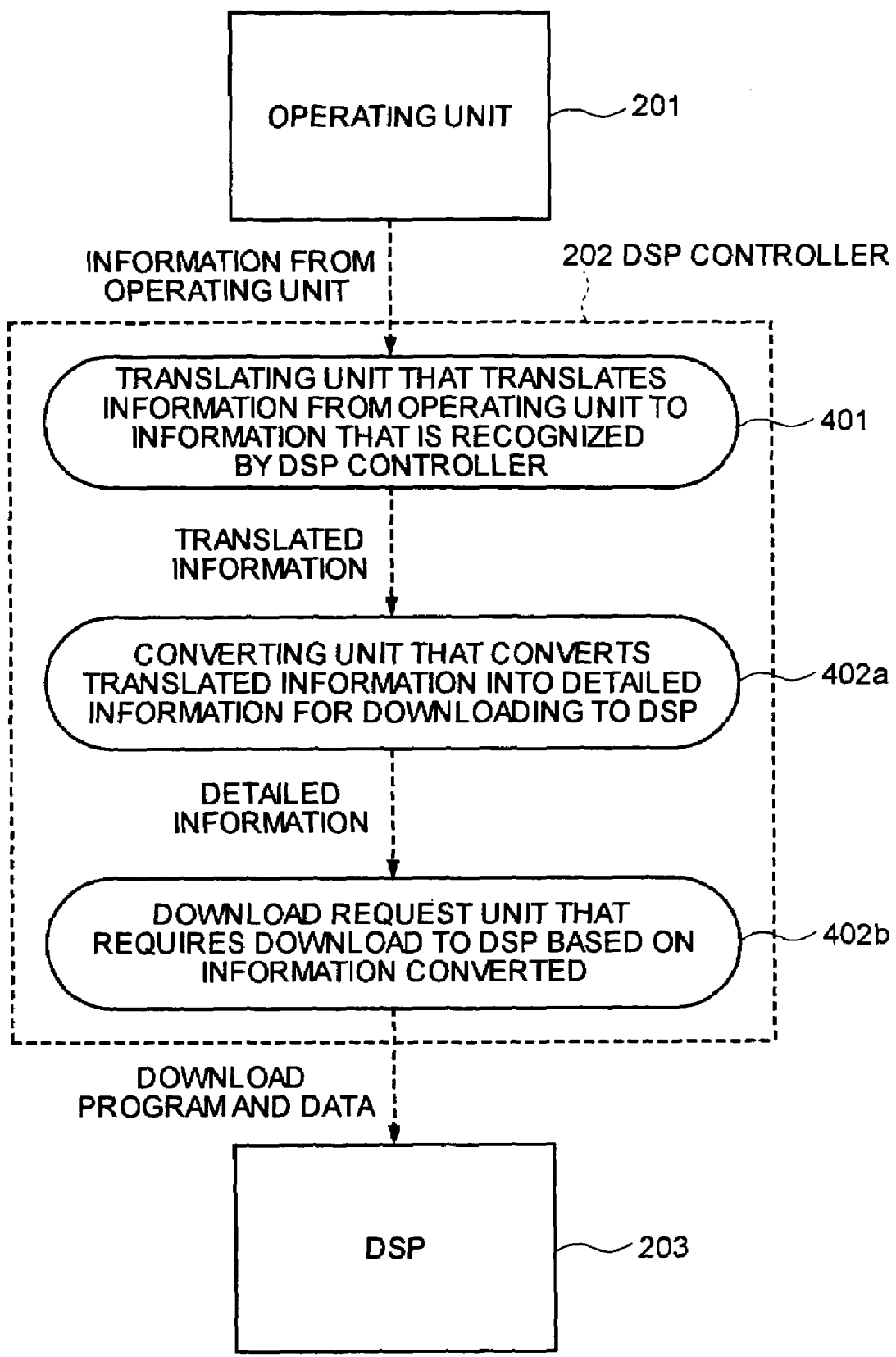
FIG. 10 is a schematic diagram of a DSP controller and an overall system according to a third embodiment of the present invention.

Thus, according to the present embodiment following effects are achieved, (1) When there is a change in specifications, it is easy to specify changes (to be made) and changes in DSP control software can be made easily, (2) By using the common interface, when ASIC is to be controlled (instead of the DSP) for example, the control can be realized just by replacing a unit that sets ASIC that has the same interface as that of the DSP controller to transmit the information to the translating unit 401, and can be reused, (3) Even if the information from the operating unit is changed, changing the translating unit 401 only does not affect the downloading unit. Therefore, changes in the DSP controller can be reduced, (4) By performing the management by a table in which the request level of the operating unit indicates dimension, when a change is to be made in the computer program or the data to change an image quality, the table is changed. By changing the table, the information to be transmitted to the download request unit 402 changes based on the information translated. Therefore, the changes in the DSP controller 202 can be reduced, (5) When there is an increase in the variation of the computer program and the data that can be downloaded, the control can be performed by increasing the dimensions of the table of which the management is performed by the download request unit 402. Therefore, the changes in the DSP controller 202 can be reduced, FIG. 10 is a schematic diagram of a DSP controller and an overall system according to a third embodiment of the present invention. According to the third embodiment, functions performed by the DSP controller 202 shown in FIG. 4 according to the second embodiment is divided among the translating unit 401, a converting unit that converts to detailed information 402a, and a download request unit 402b. The translating unit 401 translates the information input from the operating unit to the information that is recognized by the DSP controller 202. The converting unit that converts to detailed information 401a converts the information to detailed information to be downloaded to the DSP 203 based on the information translated. The download request unit 402 makes a request for download to the DSP based on the information converted. In other words, the function performed by the download request unit that makes a request to the DSP based on the information translated which is denoted by reference numeral 402 is divided into two. The two functions are converting the information to the detailed information to be downloaded to the DSP 203 based on the information translated that is performed by the converting unit that converts to detailed information 402 and making the request for download to the DSP 203 based on the information converted that is performed by the download request unit 402*b*.

The DSP controller 202 in fact, is built-up in the system and is a component of the system similarly as in the second embodiment. Naturally, the porting is facilitated if not many changes are made while building in the DSP controller 202 in the form of a component in other system. For this, when in the other system, the information from the operating system 201 is changed, if the translating unit 401 is changed according to changes in the information, the porting can be performed without changing the converting unit that converts to detailed information 402*a* and the download request unit 402*b* that makes a request for download to the DSP 203 based on the information converted.

Figure 11:
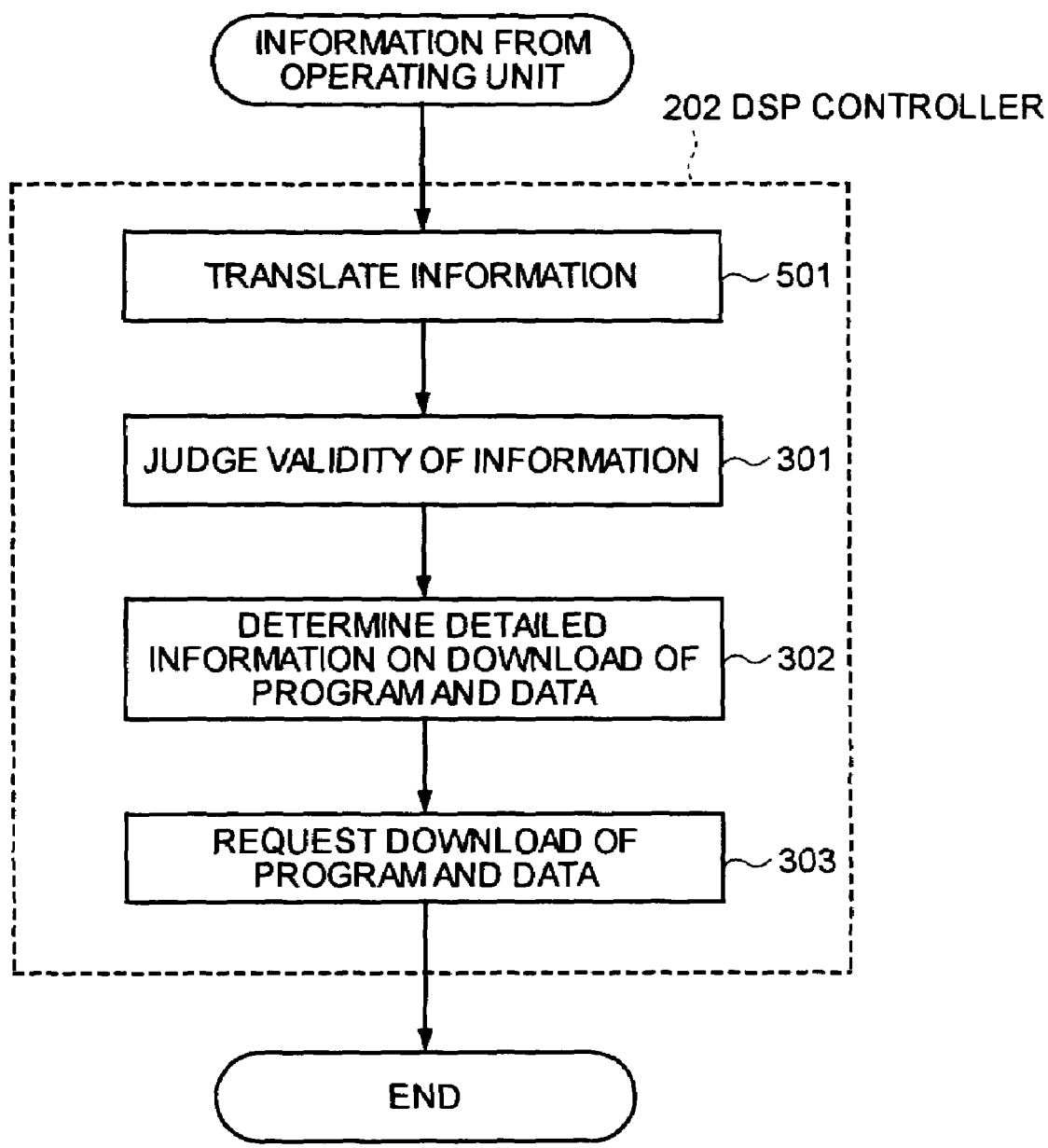
FIG. 11 is a schematic diagram for illustrating a relation between input and output of the DSP controller and a process status inside the DSP controller according to the third embodiment.

FIG. 11 is a schematic diagram for illustrating a relation between input and output of the DSP controller 202 and a process status inside the DSP controller 202 according to the third embodiment. The DSP controller 202 receives a request made by the system user from the operating unit 201 as input. The request is information like character mode, size, darkness of document, magnification, number of MTF filter etc. The DSP controller translates the information received (501) to the information that is recognized by the DSP controller. Based on the information, the DSP controller makes a judgment of validity (301), i.e. judges whether the information is valid information or invalid information. If the DSP controller 202 judges the information to be valid, the DSP controller determines download (302) of the computer program and the data based on the valid information and determines a computer program number and a data number to be downloaded to the DSP 203 with that setting. Further, the DSP controller 202 makes a request for download (303) of the computer program and the data to the DSP 203 and end the process. The DSP controller 202 is awaiting information from the operating unit after the end of the process.

Figure 12:
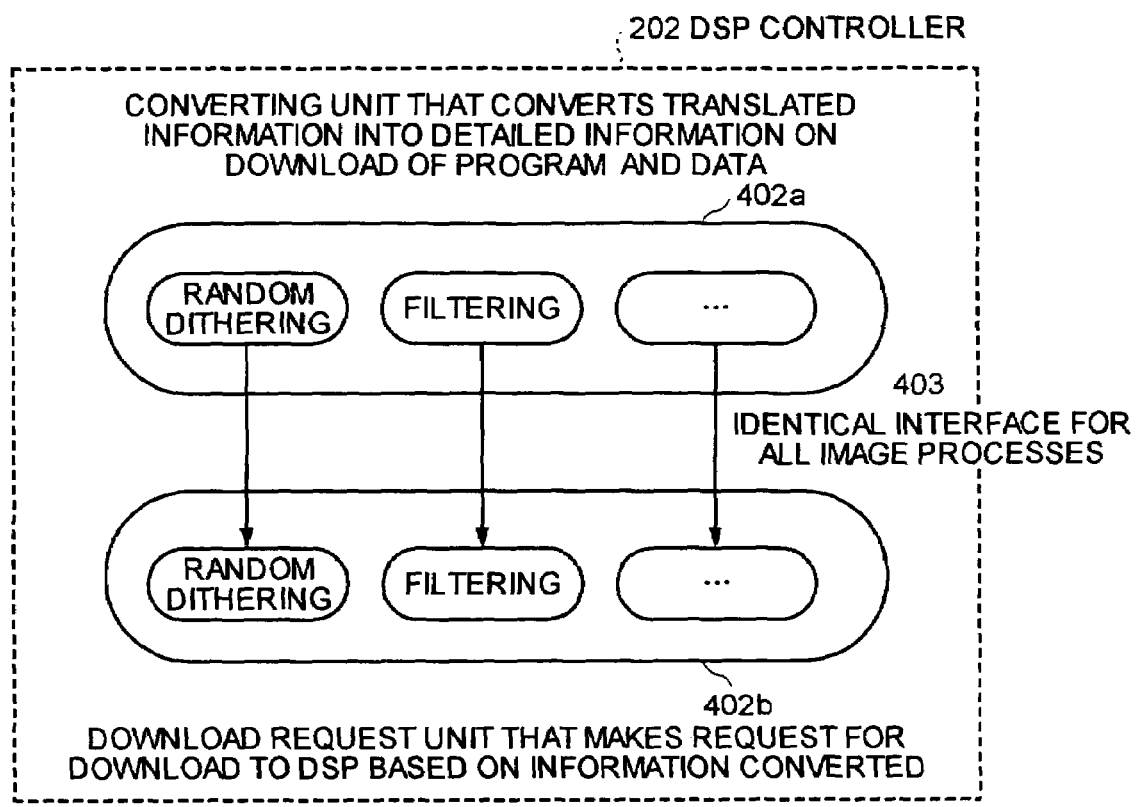
FIG. 12 is a schematic diagram for illustrating a relation between a converting unit and a download request unit according to the third embodiment.

FIG. 12 is a schematic diagram for illustrating a relation between a converting unit 402*a* and a download request unit 402*b* according to the third embodiment. The DSP can realize image processing like filtering and random dithering by downloading the computer program or the data. The download request unit 402*b* performs control according to the image processing based on the information converted from the DSP controller 202. By performing the control divided according to the image processing, when there is a change, it is easy to deal with the change.

There is a plurality of the converting unit that converts to detailed information 402*a* and the download request unit 402*b* that makes a request based on the information converted in each image processing. The converting units that convert to detailed information 402*a* and the download request unit 402*b* in each image processing have a common interface 403 for the overall image processing.

Concretely, detailed information for downloading includes information about each image processing and information of the computer program and the data for which there is a request for download. In each image processing of the download request unit 402*b* that makes request based on the information converted, the download request is transmitted to the DSP 203 based on the information of the computer program and the data for which there is a request for download.

Thus, by using the common interface, when a device that performs the image processing is changed from the DSP 203 to the ASIC, if a controller that controls the ASIC has a structure that enables control by the common interface for each image processing, it is possible to perform control without changing the converting unit that converts to detailed information 402*a* and only by changing the download request unit 402*b* to the control setting unit of the control to ASIC. Thus, the DSP controller 202 can be changed as a component that facilitates porting and can be mounted easily.

Figure 13A:
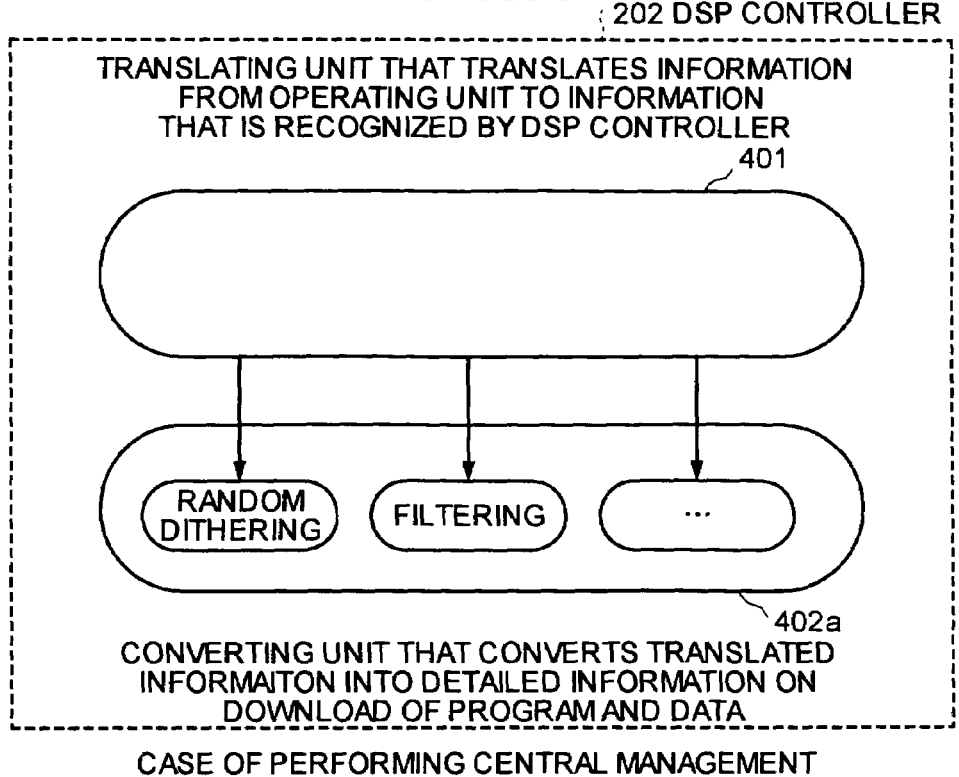
FIG. 13A and FIG. 13B are schematic diagrams for illustrating a management process of a translating unit of the DSP controller according to the third embodiment.
Figure 13B:
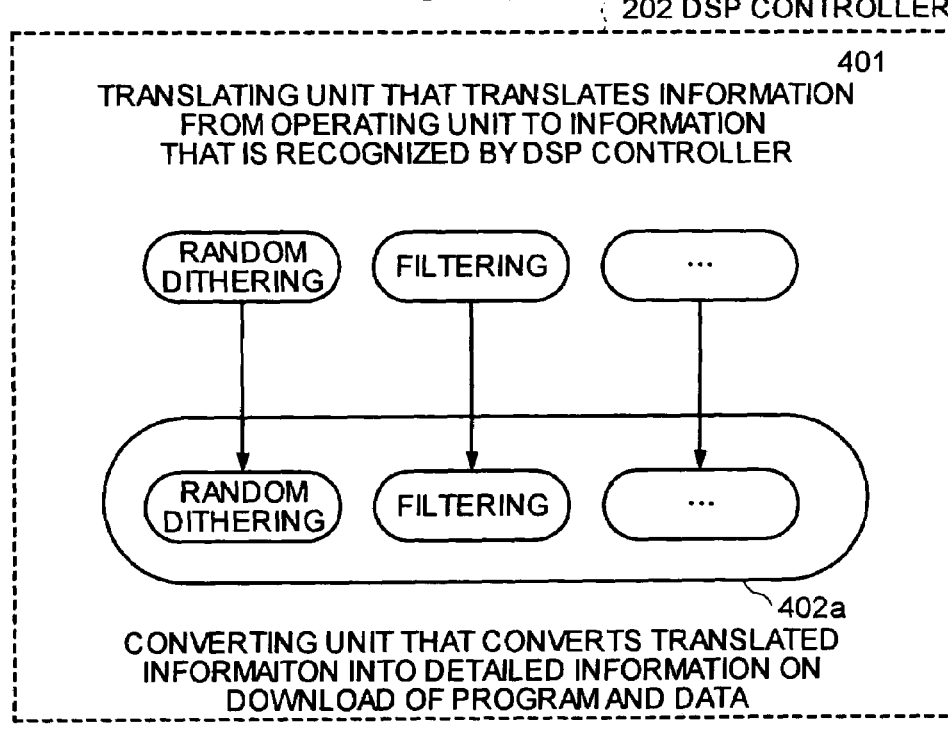

FIG. 13A and FIG. 13B are schematic diagrams for illustrating a management process of a translating unit 401 of the DSP controller 202 according to the third embodiment. FIG. 13A illustrates central management of the translating unit 401 and FIG. 13B illustrates management that is not central management.

In a case of the central management shown in FIG. 13A, the information from the operating unit 201 is translated at one location. The translating unit 401 translates the information to a language that is recognized by the DSP controller 202 and transmits the information translated to the converting unit that converts to detailed information in each image processing. In this structure, when the information from the operating unit 201 is debugged, the information is concentrated at one location. Therefore, it is possible to check all the information by tracing a value of the operating unit 201 for that location. When the information from the operating unit 201 changes and it is necessary to change the translating unit 401 at the time of porting, it is possible to build-in just by making a change in a location where the central management is performed.

In a case shown in FIG. 13B where the central management is not performed, if the information from the operating unit 201 is to be debugged or if the information from the operating unit 201 changes, and if the translating unit 401 has to be changed at the time of porting, corrections has to be made in the translating units 401 of the DSP controller 202.

Therefore, by performing the central management, when the information from the operating unit 201 changes and when the translating units are to be changed at the time of porting, it can be build up making a change in the location that is subjected to central management. This is advantageous over the case where the central management is not performed.

A table in which a dimension of a request level of the operating unit 201 is similar to that shown in FIG. 8. A computer program table that is to be referred to when the download request unit 402*b* downloads a program based on the detailed information is similar to that shown in FIG. 9.

The DSP 203, basically, can rewrite freely the computer program and the data and is supposed to realize image processing of different variations. Therefore, the information of the computer program and the data that are to be downloaded according to the request level of the operating unit 201 may keep on changing all the time. If management of code that may change any time is performed by source code management, the frequency of the job increases.

The download request unit 402*b* that makes a request for download based on the detailed information determines a plurality of computer programs like those shown in the table in FIG. 9 that belong to (attribute to) the number based on the computer program number and the data number that is determined by the translating unit 401. The download request unit 402 executes the computer program determined to make a request for download to the DSP 203 similarly as in the second embodiment.

Figure 14:
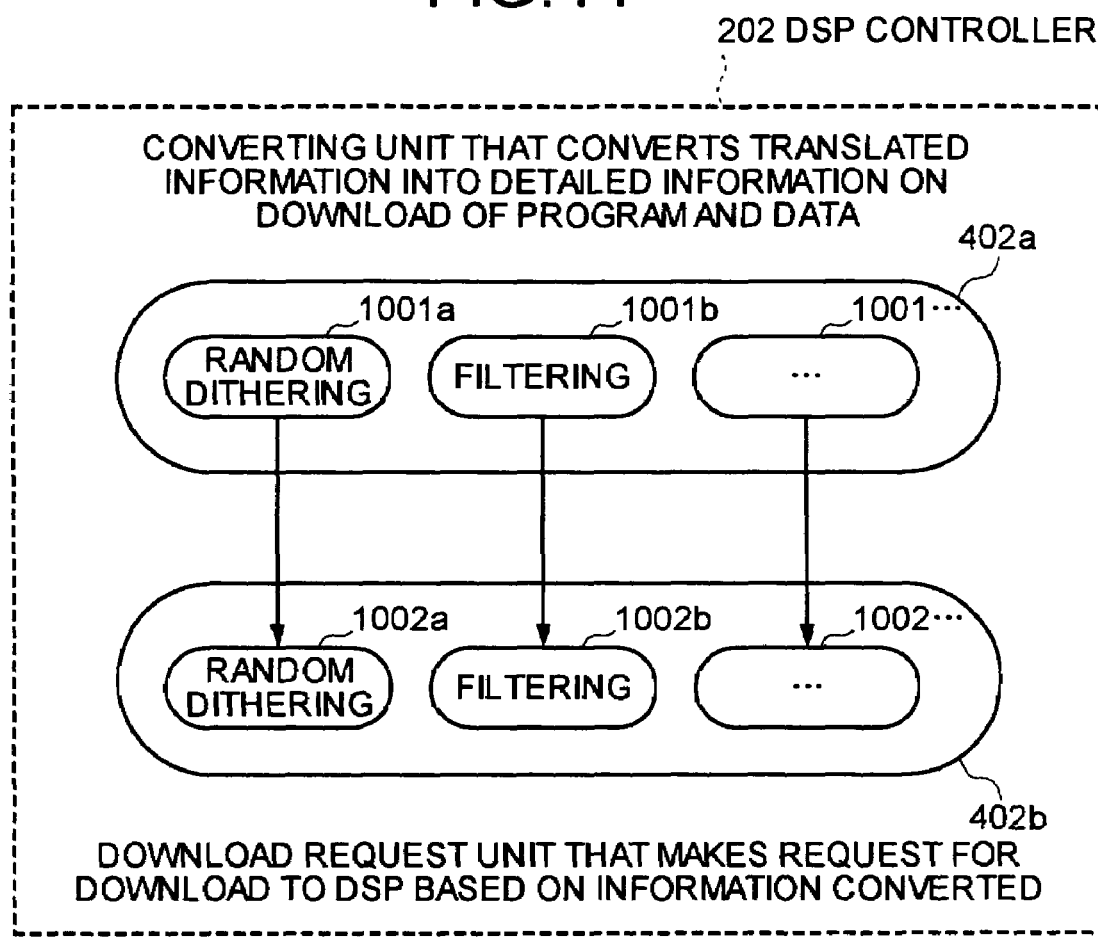
FIG. 14 is an example of a structure that performs management of the converting unit and the download request unit for each image processing.
Figure 15:
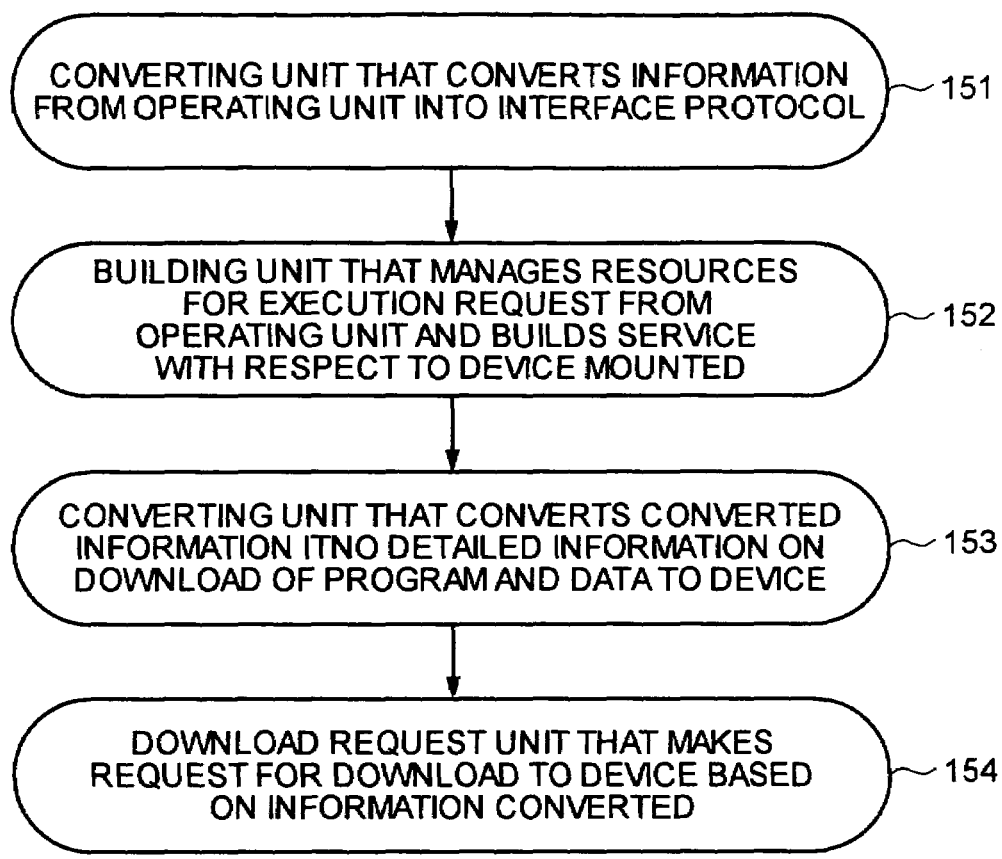
FIG. 15 is a conceptual diagram of an apparatus for controlling image processing according to a fourth embodiment of the present invention.

FIG. 14 is an example of a structure that performs management of the converting unit 402a and the download request unit 402b for each image processing. After the translating unit 401 translates the information that is required in all the image processing by the central management, the converting unit that converts to detailed information 402a converts the translated information to detailed download information for each image processing based on the information translated. Detailed level converting management units 1001a, 1001b, 1001 . . . for all image processing can refer to the information translated. Detailed level converting management units are converted for each image processing in an order starting with 1001a, 100b, 1001 . . . .

The download request unit 402b includes for each image processing download setting request-making units 1002a, 1002b, 1001 . . . similar to that divided in the detailed level converting units 1001a, 1001b, 1001, . . . . For example, the download setting request-making unit 1002b makes a judgment of whether to download a parameter that is set in the detailed level converting management unit 1001b. In the download request unit 402b, the information for each image processing that is converted by the converting unit that converts to detailed information 402 can be referred to. In other words, in a case of the filtering process, only a download setting request-making unit 1002b can refer to information that is set in the detailed level converting management unit 1001 of the filter processing. The download setting request-making unit of the filter processing makes a judgment of whether the information set matches with previous settings. If the information set does not match with the previous settings, download that is required for filtering process once again is performed. Management of other processes like random dithering etc. is also performed similarly to that of the filtering process. By performing process in such manner, it is easy to specify correction or changes in specifications since the changes are divided according to the image processing.

Moreover, by using a common interface for each interface, setting items (parameters) are determined commonly for the overall image processing and omission of settings can be prevented.

Thus, according to the present embodiment following effects are achieved, (1) When there is a change in specifications, it is easy to specify changes (to be made) and changes in DSP control software can be made easily,
(2) By using the common interface, when ASIC is to be controlled (instead of the DSP) for example, the control can be realized just by replacing a unit that sets ASIC that has the same interface as that of the DSP controller to transmit the information to the translating unit 401, and can be reused,
(3) Even if the information from the operating unit is changed, changing the translating unit 401 only does not affect the downloading unit. Therefore, changes in the DSP controller 202 can be reduced,
(4) By performing the management by a table in which the request level of the operating unit indicates dimensions, when a change is to be made in the computer program or the data to change an image quality, the table is changed. By changing the table, the information to be transmitted to the download request unit 402b changes based on the information translated. Therefore, the changes in the DSP controller can be reduced.
(5) When there is an increase in the variation of the computer program and the data that can be downloaded, the control can be performed by increasing the dimensions of the table of which the management is performed by the download request unit 402b. Therefore, the changes in the DSP controller can be reduced.
(6) If there is a change in specifications for each image processing, the control is divided for each image processing. Therefore, it is easy specify a location that has to be corrected by the DSP controller 202.

Referring back to FIG. 1, in the conventional structure (a) the ASIC that is controlled has a low degree of freedom. Therefore, the translating unit that translates information input from the operating unit to information recognized by the controller and the download request unit that makes the download request based on the information translated are integrated in the conventional structure. However, when there is a change in the specifications, a change has to be made through out. Therefore, in the new structure (b), the translating unit that translates the information input from the operating unit to information that is recognized by the DSP controller and the download request unit that makes a request for downloading to the DSP based on the information translated are separated as two units. As a result, it is possible to deal with the changes in specifications by making the minimum changes. In the structures (a) and (b), changing the control software for each device and resource management was not taken into consideration as preconditions.

For this, in a fourth embodiment, the structure (b) is divided into four units. The four units are a converting unit 151 (a unit that translates the information input to information that is recognized by a subunit), a service providing unit 152, a converting unit that converts to detailed information 153, and download request unit 154. The converting unit 151 converts the information input from the operating unit to an interface protocol. The service providing unit 152 performs resource management of a request from the operating unit and provides service to a device that is mounted. The converting unit that converts to detailed information 153 converts the information converted to detailed information for downloading to the device. The download request unit 154 makes a request for download to the device based on the information translated by the converting unit. The resource management includes for example, storing of information that is read by a scanner to a memory, transmit the information that is stored in the memory to a printer and take a print out etc. The device means a hardware device that includes a scanner, a printer, a copying machine, a memory, a large capacity memory unit as a device that performs the function independently. The units 151 to 154 include computer programs.

Thus, functions to provide service to the device mounted and to perform resource management of the request from the operating unit are added. Thus, it is possible to deal with simultaneous multiple use and to control devices of a plurality of types by one control device. Moreover, in the structure, an internal information converting unit is separated from the converting unit that converts to detailed information for downloading the information converted to the device.

Figure 16:
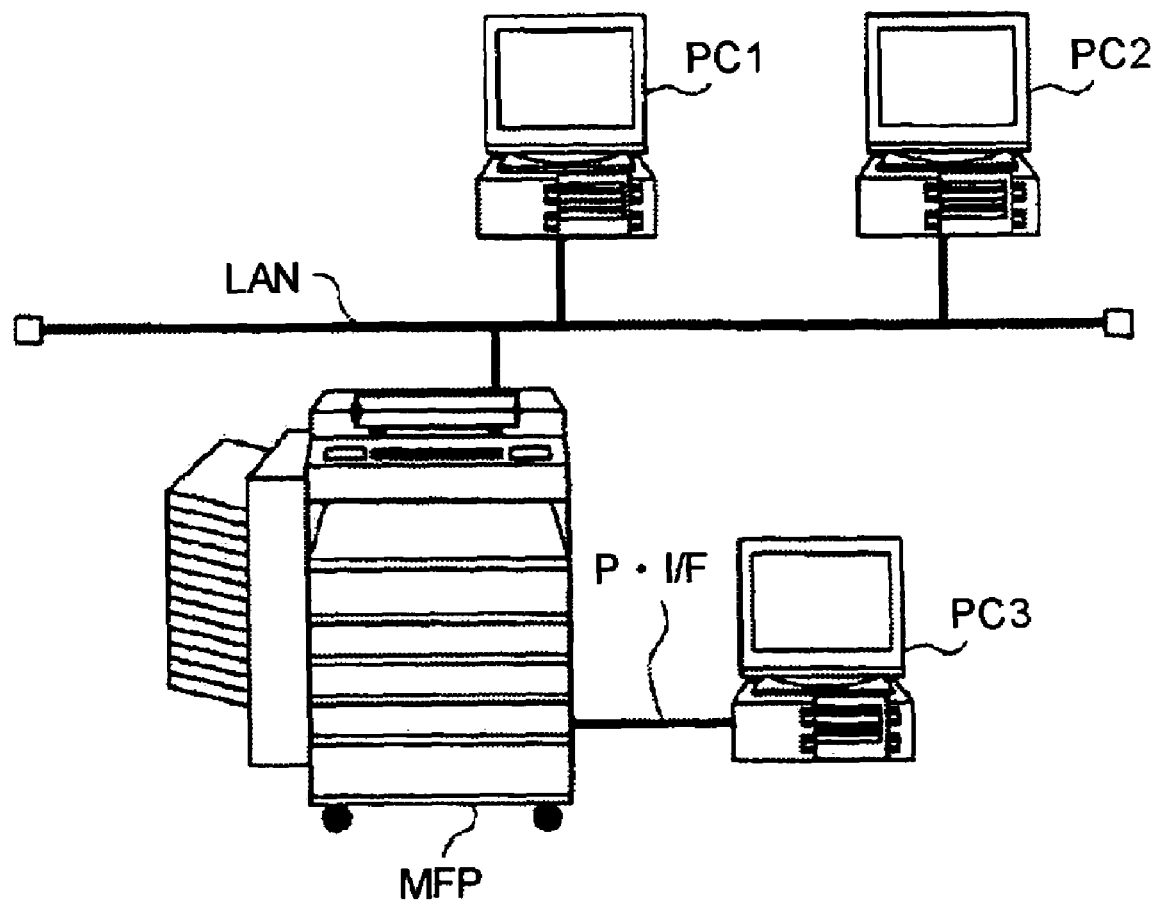
FIG. 16 is a schematic diagram of an image forming system according to the fourth embodiment.

FIG. 16 is a schematic diagram of an image forming system according to the fourth embodiment. The image forming system according to the present embodiment includes an image forming apparatus provided with functions of a scanner and a printer, host computers PC1, PC2, PC3, a LAN, and a parallel I/F (PI/F). Print data from the host computers PC1, PC2, and PC3 is transmitted to the image forming apparatus PR via the LAN and the parallel I/F (PI/F). An image can be output from the image forming apparatus. The image forming apparatus here is a so called MFP provided with functions of a printer, a copying machine, and a facsimile.

Figure 17:
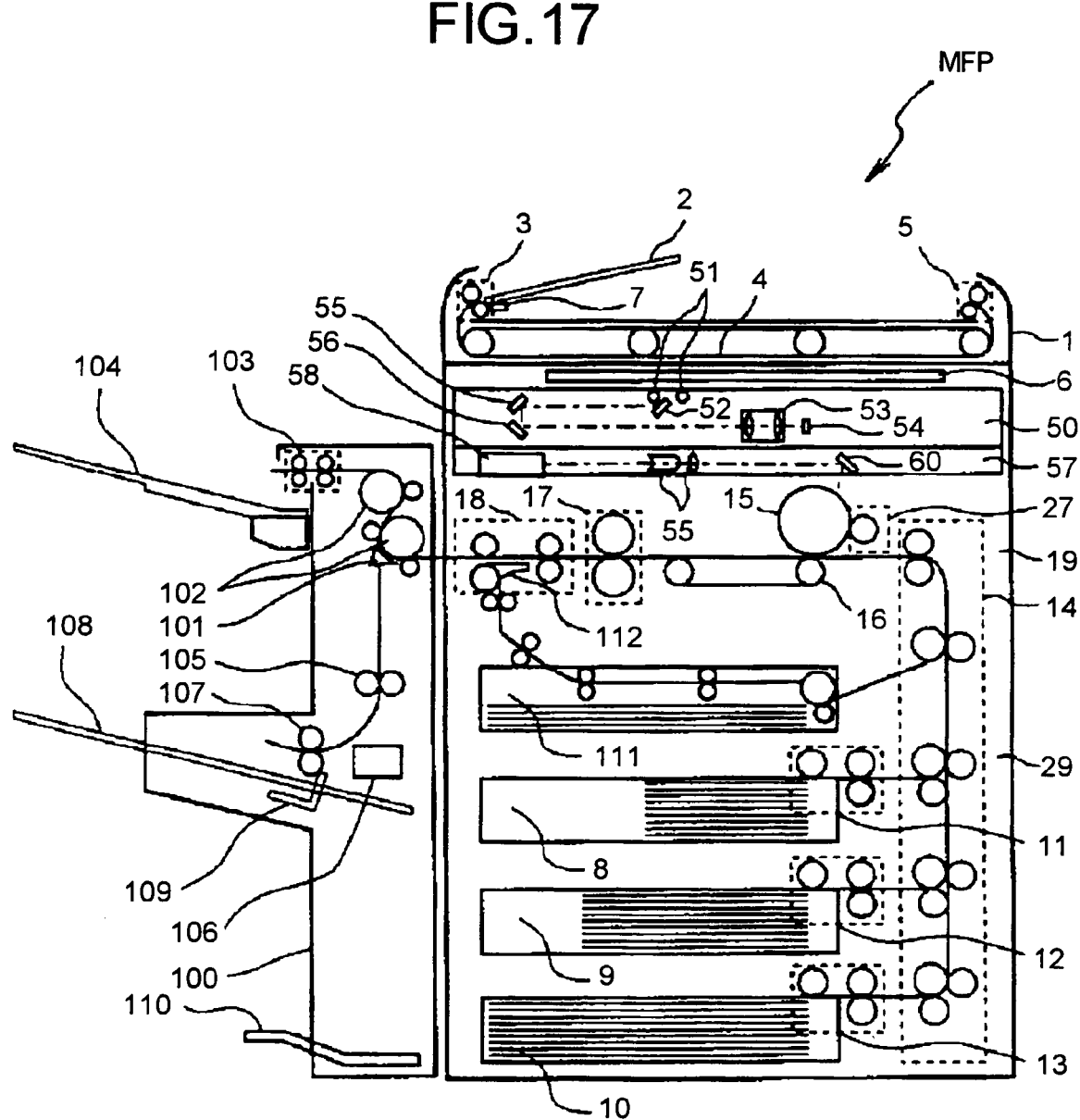
FIG. 17 is a schematic diagram of an image forming apparatus according to the fourth embodiment.

FIG. 17 is a schematic diagram of an image forming apparatus according to the fourth embodiment. The image forming apparatus includes an automatic document feeder (ADF) 1, a reading unit 50, a writing unit 57, an imaging unit 19, a paper feeding unit 29, a finisher 100, and a double-sided (duplex) paper feeding unit 111. The reading unit 50 is also referred to as a scanner and the writing unit 57, the imaging unit 19, and the paper feeding unit 29 are referred to as a printer.

The ADF 1 feeds automatically a document to be read to a reading position of the reading unit 50 and discharges the document read to a predetermined position. The reading unit 50 reads optically the document that is fed by the ADF 1 to the reading position. The writing unit 57 performs optical modulation of image data read by the reading unit and forms a latent image by writing on a photosensitive drum (an image forming medium). The latent image is developed by a toner on a transfer paper (recording medium) that is forwarded from the paper feeding unit 29. The toner image is then transferred on the paper. The image transferred is fixed and output.

In detailed, a bunch of documents is placed on a document feeding tray 2 of the ADF 1 with an image surface of a document facing upward. When a start key 34 on an operating unit 30 is pressed, a document at the bottom of the bunch of documents is carried by a feeding roller 3 and a feeding belt 4 to a predetermined position on an exposure glass 6. After the reading unit 30 reads an image data on a document on the exposure glass, the document is discharged by the feeding belt 4 and the discharge roller 5. If a document-set detecting sensor 7 detects a next document on the document feeding tray 2, the next paper is carried to the exposure glass 6 similarly as the previous document. The ADF includes the feeding roller 3, the feeding belt 4, and the discharge roller 5 which are driven by a motor.

The paper feeding unit 29 includes a first tray 8, a second tray 9, a third tray 10, three paper feeding units viz. a first paper feeding unit 11, a second paper feeding unit 12, and a third paper feeding unit 13 which pick up transfer papers respectively from the first, second, and the third trays 8, 9, and 10 respectively, and a vertical carrying unit 14 that carries the transfer papers picked up by the first, second and the third paper feeding units 11, 12, and 13 respectively towards the imaging unit 19. In the paper feeding unit 29, transfer papers that are stacked in the first, second and the third trays 8, 9, and 10 are fed by the first, second, and the third paper feeding units 11, 12, and 13 respectively and are carried by the vertical carrying unit 14 to a position where the papers come in contract with a photosensitive drum 15.

The reading unit 50 includes an exposing lamp 51, first, second, and third mirrors 52, 55, and 56 respectively, an image forming lens 59, and a CCD image sensor 54. Light reflected from the document on the exposure glass 6 that is exposed by the exposing lamp 51 is directed to the image forming lens via the first, second, and the third mirrors 52, 55, and 56 respectively. The image forming lens 59 forms an image on an image forming surface of the CCD image sensor 54. The CCD image sensor 54 reads the image.

The writing unit 57 includes laser emitting unit 58, the image forming lens 59, and a mirror 60. The laser emitting unit 58 includes a polygon mirror and the image forming lens 59 includes an fθ lens. Laser beam that is emitted from a laser diode in the laser emitting unit 58 is reflected by the polygon mirror and scans the photosensitive drum 15 in the imaging unit 19 in a main scanning direction, thereby writing the image.

In other words, the laser beam from the writing unit 57 writes the image data that is read by the reading unit 50 on the photosensitive drum 15. A developing unit 27 develops a toner image and the toner image is formed on the photosensitive drum. The toner image on the photosensitive drum 15 is transferred to the transfer paper while the transfer paper is being carried by a carrier belt 16 with a speed equivalent to rotation of the photosensitive drum 15. After transferring the toner image, the image is fixed in a fixing unit 17 and a discharge unit discharges to the finisher 100 which is a post-processing unit.

The finisher 100 performs a predetermined post-processing of the transfer paper on which the image is formed. The transfer paper that is carried by rollers in the imaging unit 19 can be directed towards a normal discharge roller 102 and a staple processing unit that includes a staple 106. The bifurcating deflector plate 101 switches the direction of the transfer paper. By switching (directing) the bifurcating deflector plate 101 upward, the transfer paper can be discharged to a normal discharge tray 104 via a transporting roller 103. By switching (directing) the bifurcating deflector plate 101 downward, the transfer paper can be discharged to a staple tray 108 via transporting rollers 105 and 107. The transfer papers piled up in the staple tray 108 are aligned by a jogger 109 upon discharge of a transfer paper. Thus direction of transportation and edge surface of the transfer papers are aligned, and a set of copies is stapled by a stapler 106. The set of copies stapled by the stapler 106 is stored in a discharge tray for stapled set 110 due to the weight of the transfer papers.

For forming images on both sides of the transfer paper, the transfer paper that is fed from any one of the trays 8, 9, and 10 is stocked in a double-sided (duplex) paper feeding unit 111 by setting a bifurcating claw 112 that switches the path upward instead of directing the transfer paper to the discharge tray 104. Further, the transfer paper that is stocked in the double-sided (duplex) paper feeding unit 111 is re-fed to transfer a toner image that is formed on the photosensitive drum 15 again. The transfer paper re-fed is carried to a carrier belt 16 position and an image is transferred on a reverse surface of the transfer paper like that transferred on a front surface. The image transferred is fixed. The bifurcating claw 112 is set downward and the transfer paper is directed to the discharge tray 104. Thus, the double-sided (duplex) paper feeding unit 111 is used to form images on both sides of a transfer paper.

Figure 18:
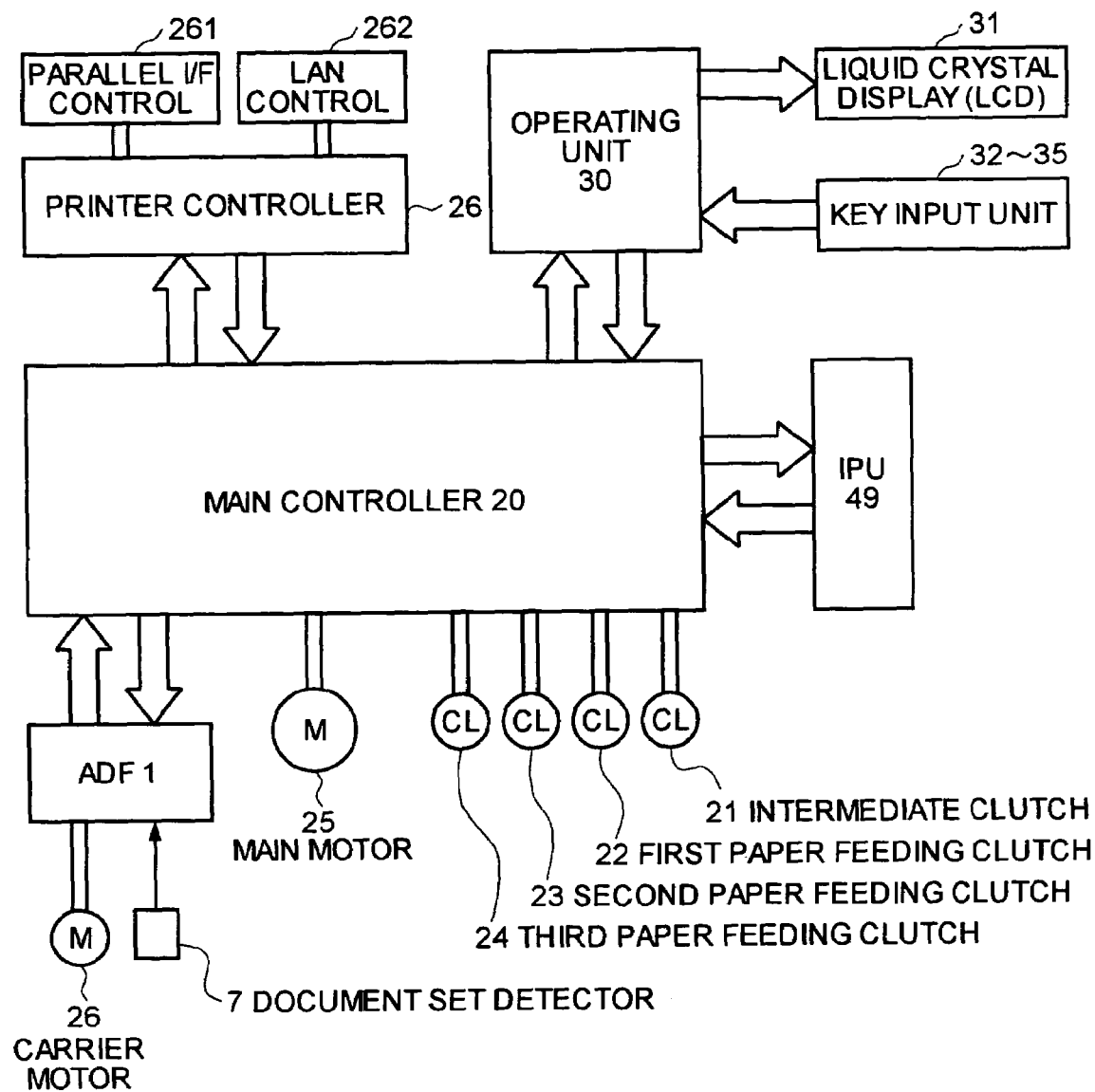
FIG. 18 is a block diagram of a control system of the image forming apparatus according to the fourth embodiment with a main controller at the center of the control system.

FIG. 18 is a block diagram of a control system of the image forming apparatus according to the fourth embodiment with a main controller at the center of the control system.

The control system includes mainly a main controller 20, an operating unit 30, an image processing unit (IPU) 49, the ADF 1, and a printer controller 26. The main controller 20 controls the image forming apparatus PR. Units performing distributed (non centralized) control like the operating unit 30, a scanner control, a control that writes a document image in an image memory, the image processing unit (IPU) 49, the ADF 1 etc. are connected to the main controller 20. The operating unit 30 displays instructions for operator and performs control by function settings that are input by the operator. The image processing unit (IPU) 49 performs control of forming an image from the image memory. Each unit performing distributed (non-centralized) control and the main controller 20 exchange information about equipment and operating instructions according to requirement. Apart from these, a main motor 25 required for carrying papers and clutches 21 to 24 are also connected to the main controller 20. In other words, the main motor 25 drives the photosensitive drum 15, the carrier belt 16, the fixing unit 17, a paper discharge unit 18, the developing unit 27 and the paper feeding units 11 to 13 are driven by a drive of the main motor 25 transmitted via the feeding clutches 22 to 24. The vertical carrying unit 14 is driven by the main motor 25 drive transmitted via the intermediate clutch 21.

The printer controller 26 interprets a command which is an instruction from outside to form an image and print the image. The printer controller 26 then converts the command to a bit map file format to be able to print as image data and interprets print mode from the command thereby determining the operation. The image and the command are received via the LAN and the parallel I/F. A LAN controller 261 and a parallel I/F 262 perform functions to receive the image and the command. Further, a liquid crystal display 31, key input units 32, 33, 34, and 35 are connected to the operating unit. A predetermined process is performed according to input from the key input units 32, 33, 34, and 35. The progress of the process and the result are output to the liquid crystal display 31 and displayed.

An operation of the imaging unit 19 up to forming of a latent image on recording surface and a reading operation by the reading unit 50 of the image forming apparatus is described below in detailed. In the following description a latent image is an electric potential distribution that is developed by converting an image to optical information and irradiating on the surface of the photosensitive drum.

The reading unit 50 includes the exposure glass 6 on which a document is mounted and an optical scanning system. The optical scanning system includes the exposing lamp 51, the first mirror 52, a lens 53, the CCD image sensor 45 etc. The exposing lamp 51 and the first mirror 52 are fixed to a first carriage that is not shown in the diagram and the second mirror 55 and the third mirror 55 are fixed to the second carriage that is not shown in the diagram. While reading an image on a document, the first carriage and the second carriage are scanned mechanically at relative speeds in a ratio of 2:1 respectively. A scanner drive motor that is not shown in the diagram drives the optical scanning system.

The CCD image sensor 54 reads the image on the document and converts to an electric signal for further processing. BY shifting the lens 53 and the CCD image sensor 54 towards left and right directions in FIG. 2, a magnification of the image changes. In other words, positions of the lens 53 and the CCD image sensor 54 are set in the left and right directions according to the magnification specified.

The writing unit 57 includes the laser emitting unit 58, the image forming lens, and the mirror 60. The laser emitting unit 58 includes the laser diode and a polygon mirror. The laser diode is a source of laser beam and the polygon mirror is rotated at a constant high speed by a motor. The laser beam irradiated from the laser emitting unit 58 is deflected by the polygon mirror and passes through the image forming lens 59. The laser beam is reflected from the mirror and gathered to form an image on the photosensitive drum 15. The laser beam deflected is scanned by exposure in a direction at right angles to a direction of rotation of the photosensitive drum 15 and an image signal that is output from a selector 64 of the IPU 49 is recorded in terms of lines (in units of lines). The image (electrostatic latent image) is formed on the photosensitive drum 15 by repeating the main scanning with a predetermined cycle corresponding to recording density and rpm of the photosensitive drum.

Thus, the laser beam output from the writing unit 57 is irradiated on the photosensitive drum 15 of the image forming system. A beam sensor that generates a main scanning synchronization signal is disposed in a position at an edge on the photosensitive drum on a scan line of the laser beam. A control of a timing of start of image recording in the main scanning direction and a generation of a control signal for input and output of the image signal that is mentioned in the latter part are performed based on the main scanning synchronization signal.

FIG. 19 is a block diagram of details of an IPU of the image forming apparatus according to the fourth embodiment. The IPU 49 includes the image reading unit 50 and the image writing unit 57.

The light from the exposing lamp 51 is irradiated on a surface of the document. Light reflected from the surface of the document forms an image on the image forming surface of the CCD image sensor 54 by the image forming lens 53. The CCD image sensor 54 converts the light received on the image forming surface after reflection to an electric signal and an A/D converter 61 converts the electric signal to a digital signal. A shading correction unit 62 performs shading correction of the digital signal and the signal is input to an MTF γ correction unit 63 where the predetermined image processing such as MTF γ correction is performed. After the image signal subjected to the image processing passes through a first print composition unit 72, the destination of the image signal is switched at a first selector 64. One of the destinations of the image signal is a magnification unit 71 and another destination is an image memory controller 65. If the magnification unit 71 is selected, the image signal that passes through the magnification unit 71 is magnified or reduced according to magnification rate and transmitted to a second selector 76. The destination of the image signal is switched to either a second print composition unit 73 or the image memory controller 65. When the image signal is transmitted to the second print composition unit 73, the image signal is transmitted to the writing unit 57 as it is. The image signal can be input to and output from image memory controller 65 in combination with the first selector 64 to the image memory controller 65 with the second selector 76. Print image data from the print image data generator 74 is input to the first print composition unit 72 and the second selector 76. An external image input output I/F 75 for output to external units like other printer connected to the LAN and input of image data that is output from a data processing unit like a personal computer is provided to the first selector 64. The first selector 64 also switches to either an input-to or output-from the external image input output I/F 75.

In a magnification process, the image data can be stored in an image memory 66 without magnification (or reduction). The image data can be transmitted to the writing unit 57 after magnification (or reduction) process upon reading from the image memory 66. An image from the image memory 66 can be magnified (or reduced) and can be returned to the image memory 66.

The IPU 49 has a function that enables selection of input and output of a plurality of data by the first selector 64 and the second selector 76. The function enables to process image data that is input to and output via the external image input-output I/F 75 or the print image data (for example data output from a data processing unit like a personal computer etc.) that is supplied from outside apart from the image data that is input from the reading unit 50.

The IPU 49 is provided with a CPU 68, a ROM 69, a RAM 70, the image memory controller 65, and the image memory 66. The CPU 68 performs setting of the image memory controller 65 and controls the reading unit 50 and the writing unit 57. The ROM 69 stores a computer program that is executed by the CPU 68 and the RAM 70 stores data that is used during execution of the computer program. The RAM 70 also functions as a work area during execution of the computer program by the CPU 68. Moreover, the CPU 68 via the image memory controller writes data of the image memory 66 and reads the data. An I/O port 67 is provided to connect external equipments.

When the image forming apparatus is to be used as a printer image data from a personal computer that is connected locally or via network is stored first in a memory. When the image forming apparatus is to be used as a copying machine, image data that is read by the scanner is to be stored first in the memory. When the image forming apparatus is to be used as a facsimile, image data that is transferred by using a communication line is to be stored first in the memory. In the image forming apparatus, the data stored in the memory is read and image process is performed. An image is formed based on the image data processed. The image processing includes processes like shading correction, γ correction, MTF correction, pseudo half tone process. In the image forming apparatus MFP, the image processing unit IPU 49 performs function of an apparatus for controlling image processing. The image processing apparatus MFP according to the present embodiment is to be connected to a network and to be used by a plurality of user simultaneously.

The apparatus for controlling image processing controls a device that performs image processing. The main control software that is a service layer transmits information that is set in the operating unit to the apparatus for controlling image processing. The apparatus for controlling image processing sets a computer program and data of the filtering process that is required for image processing which are image processing parameters in the device that performs the image processing. The apparatus for controlling image processing performs image processing by transmitting digitized image information to the device.

Figure 20A:
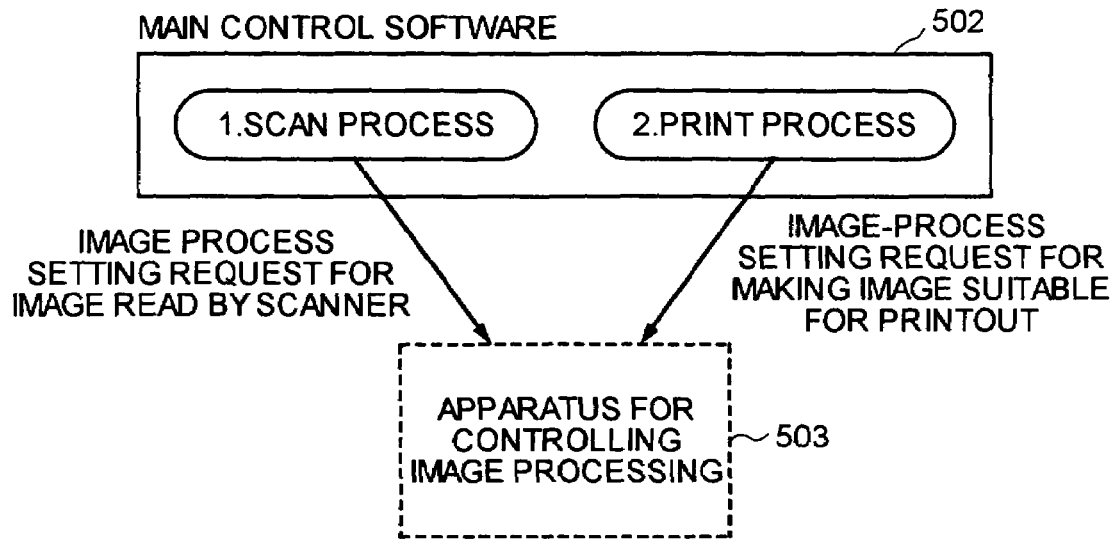
FIG. 20A and FIG. 20B are schematic diagrams for illustrating a relation between a request-making process and a resource of the image forming apparatus according to the fourth embodiment.
Figure 20B:
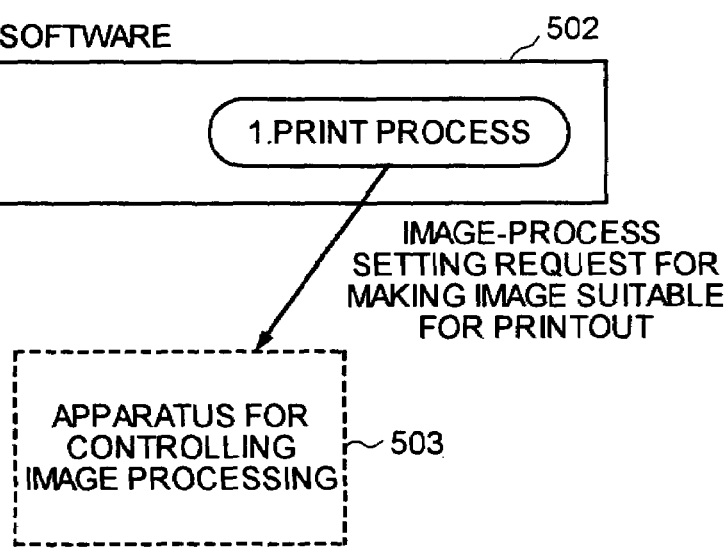

FIG. 20A and FIG. 20B are schematic diagrams for illustrating a relation between a request-making process and a resource of the image forming apparatus according to the fourth embodiment. An example of a copy operation and an example of a print operation are illustrated. A main control software 502 performs tasks (process management) according to setting on the operating unit 30. An image processing setting request for an image read by the scanner 50 during the copy operation is made by a scan process to an apparatus for controlling image processing 503. Further, an order is followed in which an image processing setting request to make an image suitable for print out is made from a printer process to the apparatus for controlling image processing 503 (FIG. 20A). During the print out operation, there is no image scan operation. Therefore, only the setting request is made by the printer process to the apparatus for controlling image processing 503 (FIG. 20B).

Due to this, when the print process request of the print out is made by a client PC that is connected to the network (LAN) when the printer process request is made during the copy operation, more than one setting requests are made to the printer (image forming apparatus MFP). In this case, if the process request of the main control software 502 is performed according to the request, there is more than one setting request made to one device. This may give rise to a case where the image processing is performed by a device in which image processing parameters other than the request are set. The following embodiment describes the apparatus for controlling image processing 503 in an external environment of such an image forming apparatus MFP. The external environment does not mean an environment that is built-in integrally and inseparably with the image forming apparatus MFP and cannot function independently from the apparatus for controlling image processing 503 during operation. The external environment signifies an operation environment in which processing of other devices is performed independently from the image forming apparatus MFP.

FIG. 21 is an example of an image processing that includes the apparatus for controlling image processing according to the fourth embodiment. The image forming apparatus MFP includes the operating unit 30, the main control software 502, the apparatus for controlling image processing 503, and a plurality of image processing devices 504a, 504b (in this case two devices). The operating unit 30 is for inputting requests from the system user. The main control software 502 performs management of information of the operating unit 30. The apparatus for controlling image processing 503 controls download information and resource status of the image processing device. The image processing devices perform image processing based on the information downloaded by the apparatus for controlling image processing 503.

Settings according to various requests from the users can be made in the operating unit 30. The main control software 502 which is a service layer divides the information of the operating unit 30 into tasks according to the setting or setting time and informs the apparatus for controlling image processing 503 as a process. The information with different request levels of the operating unit 30 is converted to a computer program and data that has to be set in the image processing device 504 (504a and 504b) in the apparatus for controlling image processing 503. Various requests are made from the operating unit 30 that include mode levels like character mode, function levels that specify the number of a computer program of an MTF filter directly, and service commands. The apparatus for controlling image processing 503 converts information of detailed level that is required to download to the image processing device 504 based on the information from the operating unit 30 corresponding to the requests. The apparatus for controlling image processing 503 performs the download to a memory in the image processing device 504 based on the computer program and data converted by the apparatus for controlling image processing 503. After downloading, the image processing device 504 realizes image processing that is instructed or set in the image processing device 504 based on the computer program and data downloaded.

FIG. 22 is a schematic diagram for illustrating operating procedure of the apparatus for controlling image processing 503. FIG. 23 is a schematic diagram for illustrating a process sequence of one process of the apparatus for controlling image processing 503. The apparatus for controlling image processing 503 includes a processing unit that performs management of one process request 503-1, a processing unit that converts external information 503-2, a processing unit that judges resource status and save process information 503-3, a processing unit that determines detailed information for download of computer programs and data 503-4, and a processing unit that requests download of computer programs and data 503-5. Each of the processing units is provided as a computer program. Further the processing unit that performs management of one process request 503-1 includes a one process request management unit 601, an interface protocol management unit 602, a resource management and service management unit 603, a conversion to detailed information management unit 604, and a download request management unit 605.

The download request management unit 605, apart from the DSP according to the present embodiment, is a mounted unit that depends on an IPS (Image Processor System). The process request management unit 601, the interface protocol management unit 602, the resource management and service management unit 603, the conversion to detailed information management unit 604 do not depend on the DSP etc. (are comparatively less dependent on the DSP etc.). In other words, in the apparatus for controlling image processing 503 according to the present embodiment, the module configuration is divided between the mounted unit and the processing unit and the modules that depend on the DSP are arranged separately.

With such a configuration, the apparatus for controlling image processing 503 receives a request made by the system user from the main control software 502 via the operating unit 30 as input. The request is information like process information, character mode, size, darkness of document, magnification, a number of MTF filter etc. From the information received, the apparatus for controlling image processing 503 performs management of one process request. Corresponding to the current request, the one process request management unit 601 makes a request to convert external information 503-2 to the interface protocol management unit 602 and converts the information of the operating units 30 to internal variables. The process is as shown by (1) in the sequence diagram in FIG. 23. Conversion of external information to internal variable results in increase in processes. However, the conversion prevents change in the apparatus for controlling image processing 503 due to effect of the external information on the process in the apparatus for controlling image processing 503.

After conversion to the internal information that includes the process information, a process shown by (2) in the sequence diagram is performed. In the process, the one process request management unit 601 makes a request to the resource management and service management unit 603 to make a judgment of resource status. The resource management and service management unit 603 makes a judgment of the status of the resource acquired in the past and resource to be acquired from the current process information, and makes a judgment of whether the process can be performed. If the process can be performed, the process progresses as shown by (3) in the sequence diagram. If the process cannot be performed, the main control software 502 is informed of a wait status and the request is to be received once again. The resource status in the step 503-3 signifies status of the resource like a status in which image information is transferred from the scanner to the memory (S to M) or a status in which the image information is transferred from the memory to the printer etc.

In the process according to the sequence (3), a request to determine detailed information for download of computer program and data (503-4) that are required for download is converted to detailed information based on the internal variables from the one process request management unit 601 and is transmitted to the conversion to detailed information management unit (hereinafter, "conversion management unit") 604. Thus, without using the internal information for download of the image processing device 504 an abstract concept of detailed information is introduced. As a result, the software that is in the form of a component can be reused.

In a last sequence (4), the resource management and service management unit 603 transmits detailed information and the request for download to the download request management unit 605 that performs management of a driver control of the image processing device 504 mounted currently. The download request management unit 605 downloads to the image processing device 504. Thus, the process performed by the processing unit that requests download of computer program and data 503-5 in FIG. 22 ends. As the process ends, the input of information from the operating unit is awaited.

There is no change according to the model in the management of one process request 503-1 and the judgment of resource status and saving process information 503-3. However, in the conversion of external information 503-2, normally the process and parameters are changed according to the model. In such a case, the process and parameters are allocated in-units (terms) of process and the parameters and a process like filtering are changed. Due to allocation and change in units of modules, the external information input from the operating unit 30 is translated to information that is adapted to the module that performs the process. In other words, the interface protocol is changed and the model change is dealt with smoothly by the image processing.

Thus, according to the present embodiment, following effects are achieved, (1) It is possible to unify an architecture unit of image processing functions like copying, scanner applications etc. by including functions necessary as the apparatus for controlling image processing 503 in components, thereby facilitating porting of the image processing functions, (2) By using the architecture unit that does not depend on the model like the management of one process request 503-1 and judgment of resource status and saving process information 503-3 as it is and by changing only a unit that is peculiar to that model like conversion of external information 503-2 according to the use, it is possible to deal with the change in the model and the software that is formed as a component can be reused.

According to a fifth embodiment, configuration (processing) of an apparatus for controlling image processing 503 is different from that in the fourth embodiment. Other units have equivalent configurations as those in the fourth embodiment. Descriptions that are similar to those in the previous embodiments are omitted and units and processes that differ are described below.

FIG. 24 is a schematic diagram of an apparatus for controlling image processing 503 and overall image processing configuration according to a fifth embodiment of the present invention. FIG. 24 illustrates a system configuration, flow of information, and sequences in one process in the apparatus for controlling image processing 503.

The apparatus for controlling image processing 503 includes the operating unit 30, the main control software 502, and image processing devices 504A and B. The operating unit 30 inputs a request from the system user. The main control software 502 transmits information of the operating unit 30 and the process information to the apparatus for controlling image processing 503. The image processing devices 504 A and B realize image processing based on the information downloaded by the apparatus for controlling image processing 503.

According to the present embodiment, the apparatus for controlling image processing 503 has different configuration than that in the fourth embodiment. In the present embodiment, the one process request management unit 601 performs a function of a manager that manages a sequence of the one process. The one process request management unit 601 transmits information necessary to perform the process by the interface protocol management unit 602, the resource management and service management unit 603, and the conversion to detailed information management unit 604 along with the request to perform the process to the interface protocol management unit 602, the resource management and service management unit 603, and the conversion to detailed information management unit 604. According to the fifth embodiment, the download request management unit 605 is there for each device unlike in the fourth embodiment. Since there are two image processing devices 504A and B in the diagram, there are two download request management units 605. However, there can be as many download request management units 605 as the number of the image processing devices. After each management unit 602, 603, and 604 perform the desired function, the resource management and service management unit 603 makes a judgment of a device that is equipped. The resource management and service management unit 603 transmits a download request together with the detailed information for download to the download request management unit 605 the performs management of download of the device. Each download management unit 605 performs a download control of the corresponding image forming device 504 according to the request.

The download request management unit 605, apart from the DSP according to the present embodiment, is a mounted unit that depends on an IPS (Image Processor System). The process request management unit 601, the interface protocol management unit 602, the resource management and service management unit 603, the conversion to detailed information management unit 604 do not depend on the DSP etc. (are comparatively less dependent on the DSP etc.). In other words, in the apparatus for controlling image processing 503 according to the present embodiment, the module configuration is divided between the mounted unit and the processing unit and the modules that depend on the DSP are arranged separately.

The sequence is as indicated by numbers in FIG. 24. When a request for control of image processing by a scanner or a printer process is transmitted from the main control software 502, the one process request management unit 601 transmits the request from the operating unit and a request for conversion of information to the interface protocol management unit 602 and converts the information to internal variables. Conversion of external information to internal variable results in increase in processes. However, the conversion prevents change in the apparatus for controlling image processing 503 due to effect of the external information on the process in the apparatus for controlling image processing 503.

To start with, in sequence (1) the one process request management unit 601 makes a request to the resource management and service management unit 603 to make a judgment of resource status. The resource management and service management unit 603 makes a judgment of the status of the resource acquired in the past and resource to be acquired from the current process information, and makes a judgment of whether the process can be performed. The judgment made is transmitted back to the one process request management unit. If the process can be performed, the process progresses as shown by sequence (3). If the process cannot be performed, the main control software 502 is informed of a wait status and the request is to be received once again.

In sequence (3), a request to determine detailed information for download of computer program and data that are required for download is converted to detailed information based on the internal variables from the once process request management unit 601 and is transmitted to the conversion management unit 604. The conversion management unit 604 converts the internal variable to detailed information for download of computer program and data required for download and transmits back to the one process request management unit 601. Thus, according to present embodiment, without using the internal information for download of the image processing device 504 an abstract concept of detailed information is introduced. As a result, the software that is in the form of a component can be reused.

In sequence (4) the one process request management unit 601 transmits detailed information for download converted to detailed information in the conversion management unit 604 to the resource management and service management unit 603 and makes a request for download to the image processing device 504. The resource management and service management unit 603 transmits detailed information for download to each download request management unit 605 that performs management of the driver control of the image processing device 504 mounted currently. Each download request management unit 605 downloads to the corresponding image processing device.

Each download management unit 605 downloads computer program and data to the corresponding image processing device according to the detailed information and the request for download that are transmitted and end the process. By dividing the download request management unit for each device, the download request management unit 605 is formed as (functions as) a component and replacement of the component can be minimized according to mounting of the image processing device 504. As the process in the apparatus for controlling image processing ends, the input information from the operating unit 30 is awaited.

The interface protocol management unit 602 mainly that has a function to translate information that is transferred from the operating unit 30 or the main control software 502 to information (language) that is recognized by an apparatus for controlling image processing of other models. The resource management and service management unit 603 and the conversion management unit 604 do not depend on the model in most of the cases. By using the one process request management unit 601, the resource management and service management unit 603, and the conversion management unit 604 of the apparatus for controlling image processing are used as they are by changing only a unit that is peculiar to that model like interface protocol management unit 603 according to the use, it is possible to deal with the change in the model and the software that is formed as a component can be reused.

The other units are identical to those in the fourth embodiment and function identically.

Thus, according to the present embodiment, following effects are achieved, (1) Apparatus for controlling image processing is separated (divided) into following unit. A unit that performs management of one execute request, i.e. a request to perform image processing from the operating unit 30 (one process request management unit), a unit that performs management of the information input from the operating unit 30 by converting interface protocol (interface protocol management unit 602), a unit that performs resource management of the request (to perform image processing) and provides service to the device mounted (resource management and service management unit 603), and a unit that performs download setting in the device (download request management unit 605 to device). Therefore, when there is a change in specifications, it is easy to specify changes (to be made) and the configuration of the apparatus for controlling image processing can be changed easily.

(2) When porting of a particular portion only is necessary, a location that realizes that function is to be changed. Therefore, the amount of work to be done while porting is reduced.

According to a sixth embodiment, a function of the one process request management unit 401 in the fifth embodiment is developed further. The one process request management unit 401 receives requests for setting image processing parameters, image processing, end of image processing, and cancel from the operating unit 30. The one process request management unit 401 transmits one execute request to other unit like the resource management and service management unit.

FIG. 25A and FIG. 25B are schematic diagrams for illustrating a relation between an apparatus for controlling the image processing 503 and main control software 502 in image processing according to a sixth embodiment of the present invention. An image forming apparatus MFP according to the sixth embodiment transmits an initialization request 701 when power supply is put ON. The image forming apparatus MFP transmits in an order of an image processing parameters setting request 702, an image processing execute request 703, an image processing end request 704 to the apparatus for controlling image processing 503 when one process is performed commonly for a scan and a printer. When an operation is cancelled in the operation unit, an image processing cancel request is transmitted at timing during the one process. The apparatus for controlling image processing 503 performs settings in the image processing device 504 according to the requests.

At the initialization request 701 when the power supply is put ON, the service is provided to the image processing device 504 that is mounted in the resource management and service management unit 603 and initialization setting is done in each download management unit 605. By doing the initialization setting, the image processing device 504 is kept ready for a process operation.

When process is performed commonly for the scan and the printer, at the image processing parameters setting request 702, the download is performed to the image processing device 504 according to the sequence shown in FIG. 24 (FIG. 25B (c)). Information of process that is performed is saved in the resource management and service management unit 603. At the image processing parameters setting parameters request 702, image processing settings required to perform image processing of the resources secured by the image processing device are done (step S25B (b)). At the end, the resource management and service management unit 603 discards the resource information secured by the image processing execute request 703.

The image processing end request 704 is made to the download request management unit 605. Each download request management unit 605 makes image processing end setting in the image processing device 504 and the apparatus for controlling image processing 503 and the image processing device 504 are in a state of awaiting input (FIG. 25B (c)). When the image processing cancel request 705 is transmitted during the process operation, the resource management and service management unit 603 discards the resource information that is secured and the image processing cancel request is made to the download request management unit 605. Each download request management unit performs the image processing end setting in the image processing device 504 and the apparatus for controlling image processing 503 and the image processing device 504 are in the state of awaiting input (FIG. 25B (d)).

FIG. 26 to FIG. 29 are schematic diagrams for illustrating a process flow of the process performed by the apparatus controlling image processing 503 to the main control software 502. The one process request management unit 601 performs function of a manager that transmits request for performing a process and information that is necessary for a process to each processing unit for one process. Description of the image processing parameters setting request 702 is similar to the description of the sequence shown in FIG. 24, hence omitted.

When the power supply is put ON in the process shown in FIG. 26, the initialization request 701 is transmitted from the main control software 502 to the apparatus for controlling image processing 503. When the one process request management unit 601 receives the initialization request 701, it generates the resource management and service management unit 603 and transmits a request to provide service (1). The resource management and service management unit 603 is performing management of information of the image processing device 504 that is mounted and generates a service that is required (download management unit 605) when the power supply is put ON. After generating the service, the resource management and service management unit 603 makes an initialization request to the download request management unit 605. Each download request management unit 605 makes the initialization setting (3) in the corresponding image processing device 504. Thus, the image processing device 504 makes preparation for image processing.

FIG. 27 to FIG. 29 are schematic diagrams for illustrating a process flow of the apparatus for controlling image processing 503 at the image processing execute request 703, the image processing end request 704, and the image processing cancel request 705 during one process operation. Basically, when the resource is secured by the (at the) image processing parameter setting request 702 as shown in FIG. 25, in the request that follows, the flow is almost similar to that of the initialization request 701 shown in FIG. 27. The one process request management unit 601 transmits the request of the main control software 502 to the resource management and service management unit 603. The resource management and service management unit 603 understands the service that is generated. Therefore, the resource management and service management unit 603 transmits the request that is transmitted from the one process request management unit 601 for the service as it is. The resource management and service management unit 603 discards the resource information secured for the image processing end request 704 and the image processing cancel request 705 since these are end requests. The download request management unit 605 makes suitable settings corresponding to the requests in the corresponding image processing devices 504.

Other units that are not described here are similar to those in the fifth embodiment and function similarly.

Thus, according to the present embodiment, following effects are achieved in addition to the effects achieved according to the fifth embodiment, (1) Performing management of one execute request from among the requests from the operating unit 30 is built-in as a component in the apparatus for controlling image processing 503. Therefore, the resource management of the device mounted can be handled so that one execute request is judgment information.

(2) In a case of a product that is connected to the network and for which the resource management is required to be performed, the apparatus for controlling image processing 503 formed as a component performs the resource management. Therefore, the main control software 502 that transmits the information of the operating unit 30 to the apparatus for controlling image processing 503 can be prepared easily.

Figure 30A:
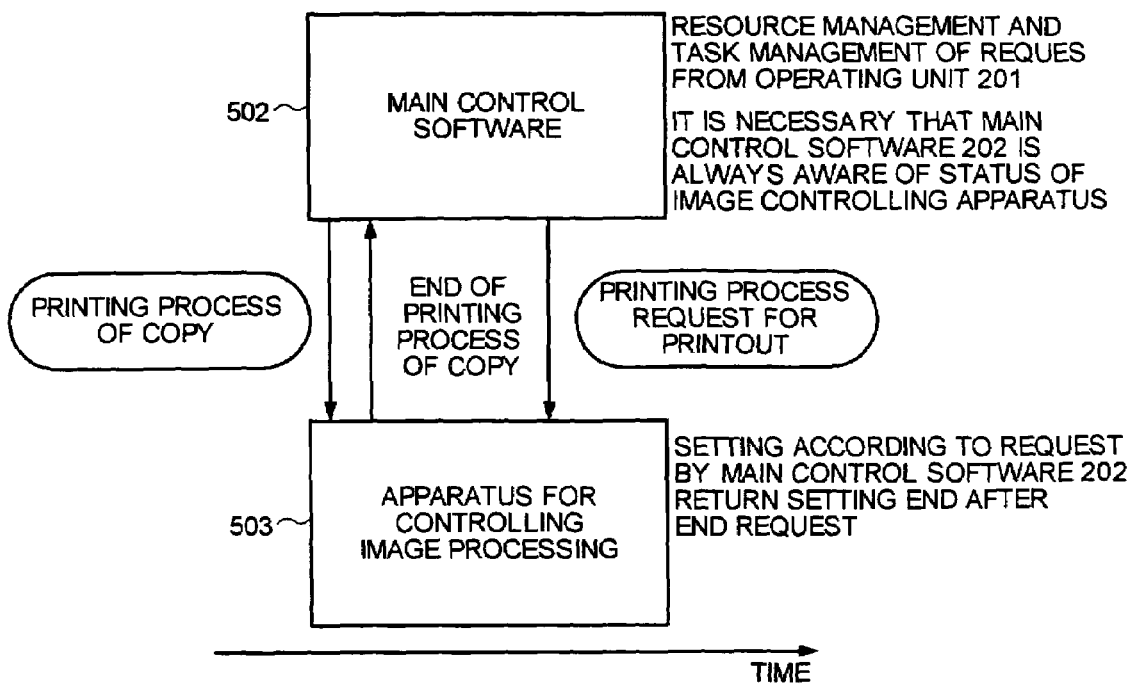
FIG. 30A and FIG. 30B are schematic diagrams for illustrating an example of resource management by main control software and an example of resource management by an apparatus for controlling image processing according to a seventh embodiment.
Figure 30B:
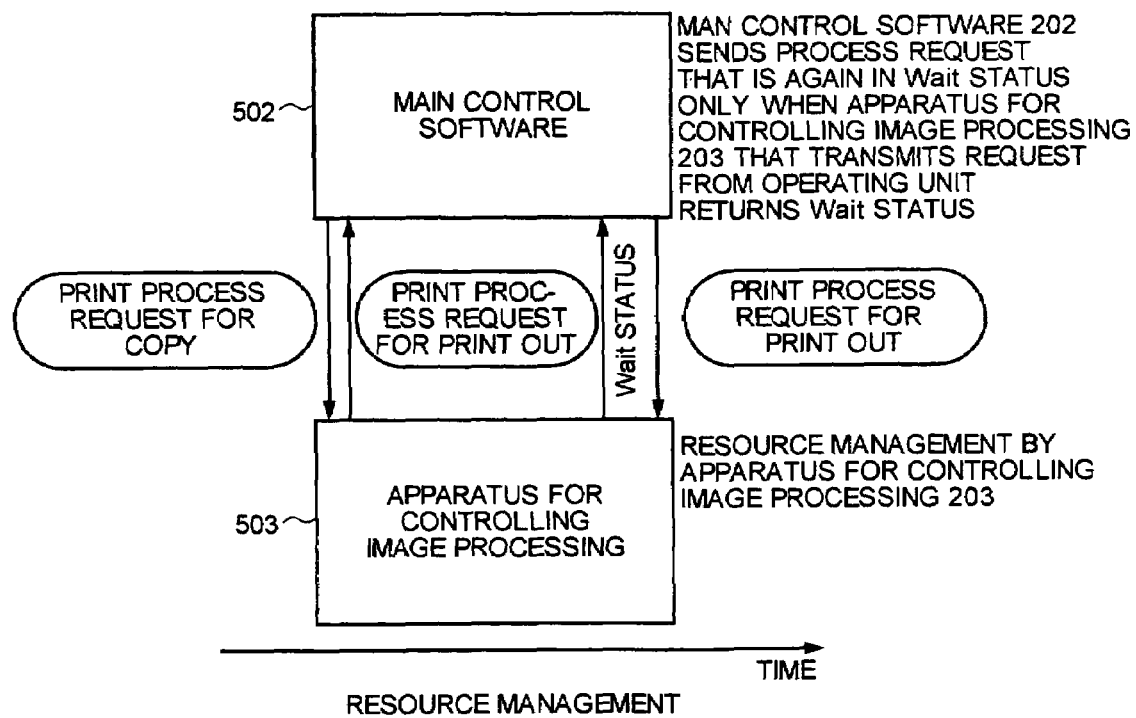

According to a seventh embodiment, a function of the resource management in the fifth embodiment is developed further. FIG. 30A is an illustration of an example of the resource management by the main control software 502 and FIG. 30B is an illustration of an example of the resource management by the apparatus for controlling image processing 503. When the main control software 502 performs the resource management, it is necessary to obtain information about the apparatus for controlling image processing all the time. The main control software 502 performs task management of a request from the operating unit 30. The main control software 502 performs the resource management while performing management of creating and dumping of a scan process and a printer process. As a result, the main control software 502 may become complicated. Moreover, since it is information in the apparatus for controlling image processing, it is necessary to make a judgment of whether a process operation is to be performed by judging from a return value of the apparatus for controlling image processing 503. If the main control software 502 is not formed as a component, it is necessary to change and make the resource management process for each image forming apparatus MFP and the main control software 502 has to be build up according to the model. Building up and loading of the software takes time and effort.

For this, in the seventh embodiment, the apparatus for controlling image processing that is suitable to 2 performs the resource management. The apparatus for controlling image processing 503 is to be built-in in the image forming apparatus MFP as a component. Therefore, the identical resource management unit 603 which can be considered as an architecture can be used as a fixed component. The main control software 502 transmits the requests from the operating unit 30 one after another as processes to the apparatus for controlling image processing 503. Only in a case when the apparatus for controlling image processing 503 transmits a signal indicating wait status, the main control software 502 transmits a process request of wait status. In other words, the main control software 502 does not perform a part of the resource management. As a result, the software is simplified and the work can be done easily.

Figure 31A:
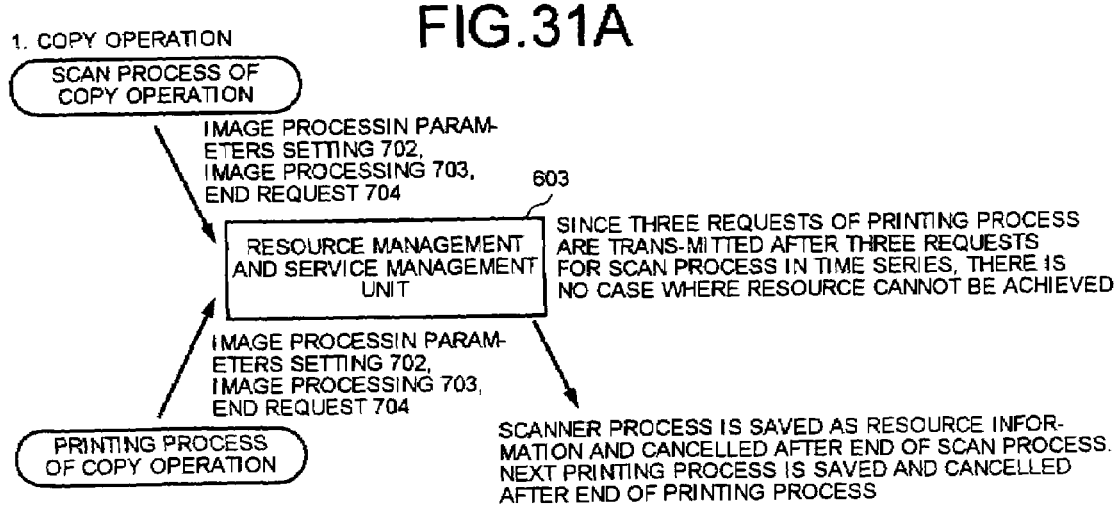
FIG. 31A, FIG. 31B, and FIG. 31C are schematic diagrams for illustrating examples of a control of resource management according to the seventh embodiment.
Figure 31B:
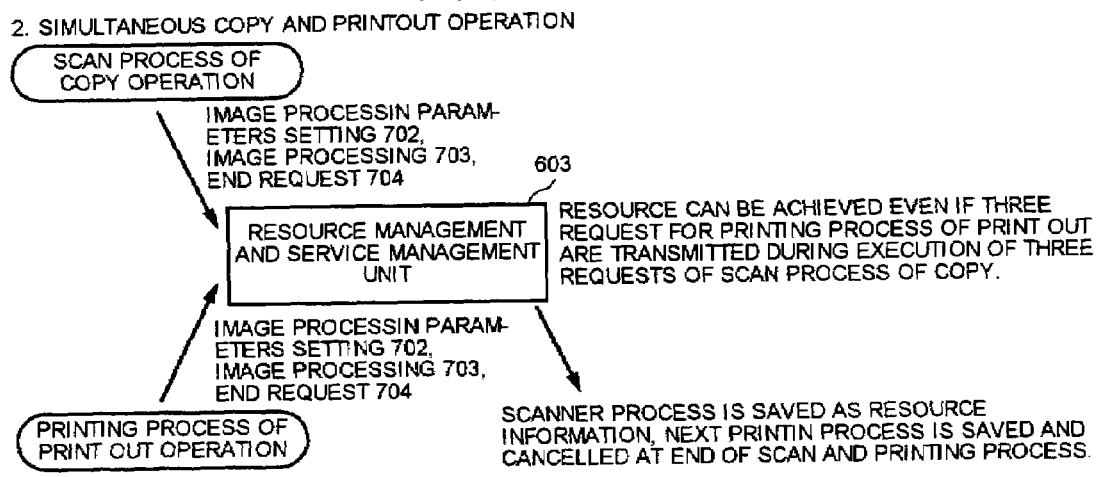
Figure 31C:
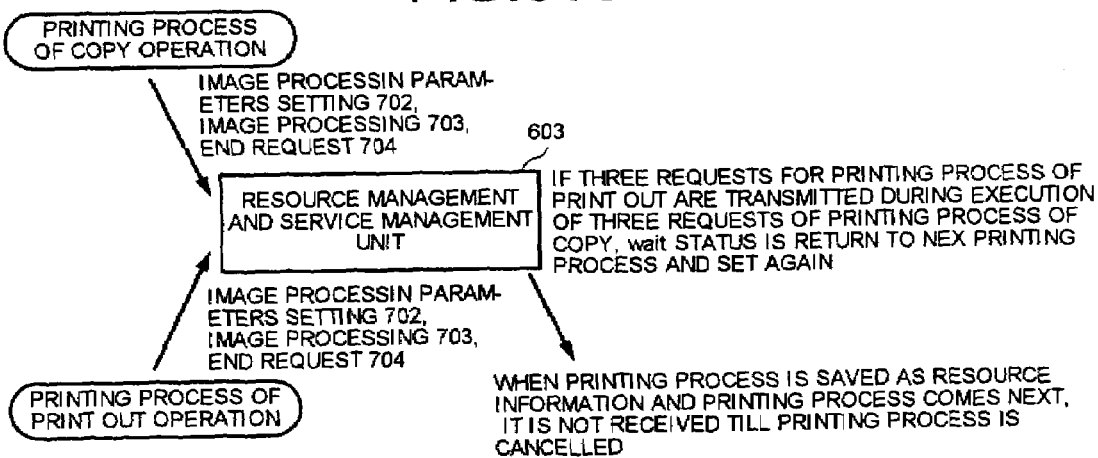

FIG. 31A, FIG. 31B, and FIG. 31C are schematic diagrams for illustrating examples of a control of resource management according to the seventh embodiment. The control is an example of the resource management in the apparatus for controlling image processing 503 in the image forming apparatus MFP.

During the copy operation, the image processing parameters setting request 702, the image processing execute request 703, and the image processing end request 704 for print process are transmitted after receiving the image processing parameters setting request 70, the image processing execute request 703, and the image processing end request 704 for scan process. Therefore, there is not possibility of clashing of the resources that may lead to inability to perform processing. The resource management and service management unit 603 of the apparatus for controlling image processing 503 saves the scan process as resource information, discards it after the end of the scan process processing, saves the next process, and discards it after the end of the scan process processing, and waits for input.

Next is an example of generation of the image processing parameters request 702 of the print process of the print out in between three requests of scan process of copy, in a simultaneous copy and printout operation 1. In this case, in the apparatus for controlling image processing 503 and in the resource management and service management unit 603, a scanner process is saved resource information; the next print process is saved, and are discarded at each request after the print process processing ends, and waits for input. Since there are two different processes, viz. the scan process and the print process, in this case particularly there is image processing device 504 for each process thereby enabling to secure resource. Whereas, when the image processing is to be realized by one image processing device 504 by all process operations, it is necessary to delay the execution of the process with a wait status for the next process operation till the end of the one process (FIG. 31B).

In the simultaneous copy and printout operation 2, an example where the image processing parameter setting request 702 of the print process of print out is generated during (in between) three requests of the print process of copy. The resources clash only in this case. Therefore, for the print process of print out for which there is a request made later, the apparatus for controlling image processing transmits the wait status, lets the main control software 502 to delay the process and the request is received once again. In this case, in the resource management and service management unit 603 of the apparatus for controlling image processing 503, a print process of the first copy is saved. When a request for the print process of print out is transmitted, the request is not received till the print process of the first copy is discarded and wait status is transmitted to the main control software 502. When the image processing end request 704 is transmitted from the print process of copy and the resource management and service management unit 603 has discarded resource information of the print process of copy, the apparatus for controlling image processing 503 is in a position to perform processing of the print process of print out that has transmitted the wait status. When three requests of the print process of print out are transmitted first followed by a request of print process of copy, the apparatus for controlling image processing 503 does not receive a signal for processing of the request of print process that is transmitted later till the three requests of the first print process end. (FIG. 31C).

Other units that are not described here have same configurations as those in the fifth embodiment and perform equivalent functions.

Thus, according to the present embodiment, following effects are achieved in addition to the effects achieved according to the fifth embodiment, (1) To use the apparatus for controlling image processing 503 in a network, the resource management of execute request from the operating unit 30 is built-in as a component in the apparatus for controlling image processing 503. Due to this, in a product suitable for network, the resource management can be used as a common function of the apparatus for controlling image processing 503. Therefore, the software that is formed as a component can be reused efficiently.

(2) In a case of a product that is connected to the network and for which the resource management is required to be performed, the apparatus for controlling image processing 503 formed as a component performs the resource management. Therefore, the main control software 502 that transmits the information of the operating unit 30 to the apparatus for controlling image processing 503 can be prepared easily.

Figure 32:
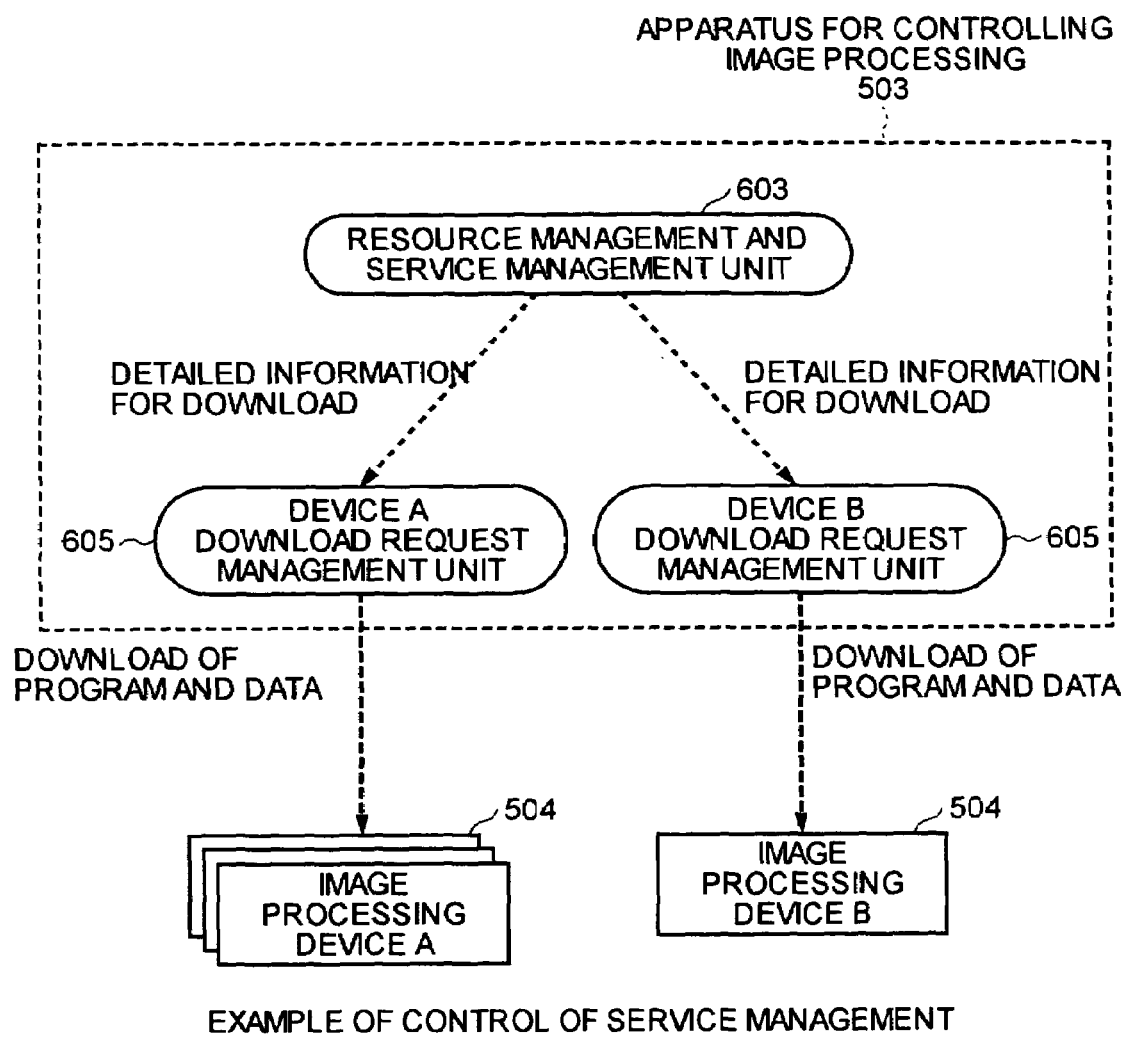
FIG. 32 is a schematic diagram for illustrating an example of a control of resource management according to an eighth embodiment of the present invention.

According to an eighth embodiment of the present invention, a function of service management in the fifth embodiment is developed further. FIG. 32 is a schematic diagram for illustrating an example of a control of resource management according to the eighth embodiment. The apparatus for controlling image processing 503 in the image forming apparatus MFP according to the present embodiment controls three image processing devices A (DSP) and one image processing device B (ASIC). Thus, the three image processing devices A (DSP) and one image processing device B (ASIC) are controlled by only one apparatus for controlling image processing 503. The apparatus for controlling image processing 503 includes one resource management and service management unit 603.

As explained in the sixth embodiment, when the power supply is put ON, while the initialization request of the main control software 502 is executed, the download request management unit 605 for the device A and the download request management unit 605 for the device B are generated and the download request management units 605 are allowed to perform download control of the image processing device 504. As shown in FIG. 31, control specifications of the download request management unit 605 change according to the type, irrespective of the number of devices. Therefore, there are independent download request management units 605 according to number of types. Depending on the image forming apparatus MFP, there are image processing devices 504 that are realized only by DSP or only by ASIC. For image processing devices 504 that are realized only by DSP or only by ASIC, a control structure can be built just by porting the download request management unit 605 for the respective image processing devices 504. For this reason, one download request management unit 605 is mounted for controlling the image processing device 504 (DSP or ASIC).

The resource management and service management unit 603 transmits to each download request management unit 605 detailed information converted by the conversion to detailed information management unit 604 and detailed information for download that is required for download setting, when a request for the image processing parameter setting is made by the one process request management unit 601. Each download request management unit 605 downloads a computer program, data to the corresponding image processing device 504 and performs setting of image processing parameters in the image processing device 504.

Other units that are not described here have same configurations as those in the fifth embodiment and perform equivalent functions.

Thus, according to the present embodiment, following effects are achieved in addition to the effects achieved according to the fifth embodiment, A service is provided to a device that is mounted and service management is performed. By doing so, the device that is mounted can be judged and the service that is to be provided can be switched according to the mounting. As a result, it is possible to realize download to a device of more than one type in one image forming apparatus MFP, thereby reducing the amount of work during porting.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image processing control method that realizes a function of image processing by downloading a program and data to an image processing unit based on an information from an operating unit, comprising:
    converting the information from the operating unit into an internal variable based on a request for controlling image processing from a main control software;
    determining, based on a status of previously acquired resource and current process information, a resource that has to be acquired to make a response to a request for the resource;
    determining whether the process is executable with the resource requested;
    converting the internal variable, upon determining that the process is executable with the resource requested, into detailed information required for downloading the program and the data;
    converting, by a plurality of detailed level converting management units, the detailed information into a plurality of parameters corresponding to the information from the operating unit;
    linking each of the plurality of detailed level converting management units to only a corresponding download setting request-making unit by referring to the information converted from the operating unit for each image processing;
    comparing, by a plurality of the download setting request-making units, each individual parameter to only a corresponding previous setting for the individual parameter set in a linked detailed level converting management unit; and
    downloading only parameters with changed settings to the image processing unit based on a request for executing download.

2. An apparatus for controlling image processing comprising:
    an image processing unit that realizes a function of image processing by downloading a program and data;
    a first converting unit that converts information from an operating unit into information for downloading the program and the data to the image processing unit; and
    a downloading unit including
        a translating unit that translates the information from the operating unit into information recognized by the first converting unit,
        a second converting unit that converts information translated by the translating unit into detailed information for downloading the program and the data to the image processing unit, and
        a download request unit, including a plurality of detailed level converting management units and a plurality of download setting request-making units that are each linked to only a corresponding detailed level converting management unit by referring to the information translated by the translating unit for each image processing, wherein
    the downloading unit converts the detailed information into a plurality of parameters corresponding to the information from the operating unit,
    the downloading unit compares each individual parameter to only a corresponding previous setting for the individual parameter set in a linked detailed level converting management unit, and the downloading unit makes a request for downloading only parameters with changed settings to the image processing unit.

3. The apparatus for controlling image processing according to claim 2, wherein the translating unit performs a central management of the information from the operating unit.

4. The apparatus for controlling image processing according to claim 2, wherein
the download request unit includes an information table for managing the detailed information, and
the download request unit determines the program and the data to be downloaded to the image processing unit based on the information table.

5. The apparatus for controlling image processing according to claim 2, further comprising a common interface that is determined for each image processing, wherein
the translating unit transmits the information translated to the download request unit via the common interface.

6. The apparatus for controlling image processing according to claim 2, wherein
the second converting unit includes a conversion table composed of request levels from the operating unit and corresponding combination of the program and the data to be downloaded, and
the second converting unit determines the detailed information based on the conversion table.

7. The apparatus for controlling image processing according to claim 2, wherein the translating unit, the second converting unit, and the download request unit are managed for each image processing.

8. An apparatus for controlling image processing comprising:
an image processing unit that realizes a function of image processing by downloading a program and data;
a request managing unit that manages a request for single execution;
a first converting unit that converts information from an operating unit into an internal variable;
a resource managing unit that manages a resource to respond to the request for the single execution and a service of the image processing unit that has the resource;
a second converting unit that converts the internal variable into detailed information for downloading the program and the data to the image processing unit; and
a downloading unit, including a plurality of detailed level converting management units and a plurality of download setting request-making units that are each linked to only a corresponding detailed level converting management unit by referring to the information converted by the first converting unit for each image processing, wherein
the downloading unit converts the detailed information into a plurality of parameters corresponding to the information from the operating unit,
the downloading unit compares each individual parameter to only a corresponding previous setting for the individual parameter set in a linked detailed level converting management unit, and
the downloading unit makes a request for downloading only parameters with changed settings to the image processing unit.

9. The apparatus for controlling image processing according to claim 8, wherein the request managing unit receives requests for setting parameters for image processing, executing the image processing, ending the image processing, and canceling the image processing, and transmits one of the requests to other units.

10. The apparatus for controlling image processing according to claim 8, wherein the request for the single execution is made from an instruction from the operating unit via a control unit that is provided at a preceding stage of the apparatus.

11. The apparatus for controlling image processing according to claim 8, the resource managing unit, when managing the resource, determines whether to perform an image processing control based on a status of current resources reserved.

12. The apparatus for controlling image processing according to claim 8, the resource managing unit, when managing the service, determines a processing capability of the image processing unit that has the resource, and switches over the service to be provided according to the processing capability determined.

13. The apparatus for controlling image processing according to claim 8, wherein the downloading unit is provided for every image processing unit.

14. The apparatus for controlling image processing according to claim 8, wherein the image processing unit is a digital signal processor.

15. The apparatus for controlling image processing according to claim 8, wherein the image processing unit is an image processing device.

16. The apparatus for controlling image processing according to claim 15, wherein the image processing device includes at least one of a scanner or a printer.

17. An image forming apparatus comprising:
an image processing control apparatus that includes
an image processing unit that performs image processing by downloading a program and data;
a converting unit that converts information from an operating unit into information for downloading the program and the data to the image processing unit;
a downloading unit including
a translating unit that translates the information from the operating unit into information recognized by the first converting unit,
a second converting unit that converts information translated by the translating unit into detailed information for downloading the program and the data to the image processing unit, and
a download request unit, including a plurality of detailed level converting management units and a plurality of download setting request-making units that are each linked to only a corresponding detailed level converting management unit by referring to the information translated by the translating unit for each image processing, wherein
the downloading unit converts the detailed information into a plurality of parameters corresponding to the information from the operating unit,
the downloading unit compares each individual parameter to only a corresponding previous setting for the individual parameter set in a linked detailed level converting management unit, and
the downloading unit makes a request for downloading only parameters with changed settings to the image processing unit; and
an image forming unit that forms an image on a recording medium based on image information that is processed by the image processing control apparatus.

18. A computer readable storage medium encoded with instructions, which when executed by a computer, cause the computer to implement a method of controlling image processing, the method realizing a function of information processing by downloading a program and data to an information processing unit based on information from an operating unit, the method comprising:

converting the information from the operating unit into an internal variable based on a request for controlling image processing from a main control software;

determining, based on a status of previously acquired resource and current process information, a resource that has to be acquired to make a response to a request for the resource;

determining whether the process is executable with the resource requested;

converting the internal variable, upon determining that the process is executable with the resource requested, into detailed information required for downloading the program and the data;

converting, by a plurality of detailed level converting management units, the detailed information into a plurality of parameters corresponding to the information from the operating unit;

linking each of the plurality of detailed level converting management units to only a corresponding download setting request-making unit by referring to the information converted from the operating unit for each image processing;

comparing, by a plurality of the download setting request-making units, each individual parameter to only a corresponding previous setting for the individual parameter set in a linked detailed level converting management unit; and downloading only parameters with changed settings to the image processing unit based on a request for executing download; and updating an image processor based on the downloaded parameters.

* * * * *